US009442965B2

(12) United States Patent
Colena

(10) Patent No.: US 9,442,965 B2
(45) Date of Patent: *Sep. 13, 2016

(54) SYSTEM AND METHOD FOR EFFICIENT REPRESENTATION OF DYNAMIC RANGES OF NUMERIC VALUES

(71) Applicant: ORACLE INTERNATIONAL CORPORATION, Redwood Shores, CA (US)

(72) Inventor: Michael Colena, Lowell, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,490

(22) Filed: Aug. 21, 2013

(65) Prior Publication Data

US 2013/0339402 A1 Dec. 19, 2013

Related U.S. Application Data

(63) Continuation of application No. 13/342,725, filed on Jan. 3, 2012, now Pat. No. 8,521,785.

(51) Int. Cl.
*G06F 17/30* (2006.01)
*G06F 3/0488* (2013.01)
*G06F 7/00* (2006.01)

(52) U.S. Cl.
CPC ....... *G06F 17/30312* (2013.01); *G06F 3/0488* (2013.01); *G06F 7/00* (2013.01); *G06F 17/30961* (2013.01)

(58) Field of Classification Search
CPC combination set(s) only.
See application file for complete search history.

(56) References Cited

U.S. PATENT DOCUMENTS

| 6,539,394 | B1 | 3/2003 | Calvignac et al. |
| 7,089,494 | B1 | 8/2006 | Burrell |
| 7,716,250 | B1 | 5/2010 | Manasse et al. |
| 7,808,929 | B2 | 10/2010 | Wong et al. |
| 7,895,216 | B2 | 2/2011 | Longshaw et al. |

(Continued)

OTHER PUBLICATIONS

Gagie, et al., "Range Quantile Queries: Another Virtue of Wavelet Trees," Retrieved from http://arxiv.org/PS_cache/arxiv/pdf/0903/0903.4726v6.pdf, Apr. 7, 2010, 7 pages.

(Continued)

*Primary Examiner* — Shyue Jiunn Hwa
(74) *Attorney, Agent, or Firm* — Kilpatrick Townsend & Stockton LLP

(57) ABSTRACT

A method of efficiently representing ranged data sets may include storing a data structure representing a first data set. The data structure may include one or more nodes each representing distinct portions of the data set, and the first data set may include a range of multiple values bounded by an upper bound and a lower bound. A first node may represent the range of multiple values by storing the upper bound and the lower bound. The method may also include receiving a second data set to add to the first data set. The intersection of the first data set and the second data may include at least one value. The method may further include altering the one or more nodes in the data structure such that the union of each of the distinct portions of the data set represented by the one or more nodes is equivalent to the union of the first data set and the second data set; and such that the intersection of each of the distinct portions of the data set represented by the one or more nodes is equivalent to an empty data set.

16 Claims, 17 Drawing Sheets

(56) References Cited

U.S. PATENT DOCUMENTS

| | | |
|---|---|---|
| 8,171,539 B2 | 5/2012 | Miranda |
| 2005/0039077 A1* | 2/2005 | Iyer ................ G01R 31/318307 714/25 |
| 2005/0050060 A1* | 3/2005 | Damm .................... H04L 45/00 |
| 2009/0182837 A1* | 7/2009 | Rogers .............. G06F 17/30961 709/215 |
| 2011/0078104 A1* | 3/2011 | Honkola ................ G06N 5/022 706/47 |

OTHER PUBLICATIONS

Mount, et al., "A Dynamic Data Structure for Approximate Range Searching," SCG '10, Jun. 13-16, 2010, Snowbird, Utah, USA. Retrieved from https://www.cs.umd.edu/~mount/Papers?socg10-quadtreap.pdf, 2010, 10 pages.

U.S. Appl. No. 13/342,725, filed Jan. 3, 2012, Non-Final Office Action mailed Jan. 31, 2013, 25 pages.

U.S. Appl. No. 13/342,725, filed Jan. 3, 2012, Notice of Allowance mailed Apr. 22, 2013, 11 pages.

\* cited by examiner

SYSTEM AND METHOD FOR EFFICIENT REPRESENTATION OF DYNAMIC RANGES OF NUMERIC VALUES

CROSS REFERENCES

This application is a continuation of U.S. patent application Ser. No. 13/342,725 filed Jan. 3, 2012, titled "SYSTEM AND METHOD FOR EFFICIENT REPRESENTATION OF DYNAMIC RANGES OF NUMERIC VALUES," which is hereby incorporated by reference, as if set forth in full in this document, for all purposes.

BACKGROUND OF THE INVENTION

Embodiments of the present invention relate generally to data representation, and more particularly to solving constraint problems using efficient methods and systems for representing variable domains.

Constraint programming is a discipline that deals with the representation of a problem in a manner that allows for solutions to be formulated. Each variable in a constraint problem may be modeled as a solution space comprising a range of discrete or continuous values. The relations and limitations between these variables may be expressed as constraints. The constraints act to limit the values in a variable's solution space. A solution is a state in which each variable has had its domain limited to a single value without violating any of the constraints. Often, software programs known as constraint solvers may be used to find one or more solutions to a given constraint problem, or alternatively, to prove that no solution exists.

Computer systems may use a method for solving constraint problems known as Arc Consistency. Arc Consistency ensures that every value in the domain of each variable has a supporting value in the other variables that satisfies all of the constraints. Values that are not consistent may be removed from the domain of each variable. The inference power of Arc Consistency ensures that every value of a variable is consistent with its constrained neighbor variables, thus eliminating inconsistent values from each solution.

For a computer system to efficiently perform the key functionality of reasoning over valid values and eliminating invalid values, the computer system must be able to efficiently represent the domains of each variable. Existing methods for representing variable domains are limited. Hence, there is a need for improved methods and systems for efficiently representing data for solving constraint problems.

BRIEF SUMMARY OF THE INVENTION

Some embodiments describe a method, system, or computer program product for efficiently representing ranged data sets in a memory system. The method may include storing a data structure representing a first data set. The data structure may include one or more nodes each representing distinct portions of the data set, and the first data set may include a range of multiple values bounded by an upper bound and a lower bound. A first node may represent the range of multiple values by storing the upper bound and the lower bound. The method may also include receiving a second data set to add to the first data set. The intersection of the first data set and the second data set may include at least one value. The method may further include altering the one or more nodes in the data structure such that the union of each of the distinct portions of the data set represented by the one or more nodes is equivalent to the union of the first data set and the second data set; and such that the intersection of each of the distinct portions of the data set represented by the one or more nodes is equivalent to an empty data set.

DETAILED DESCRIPTION OF THE INVENTION

Figure 1:
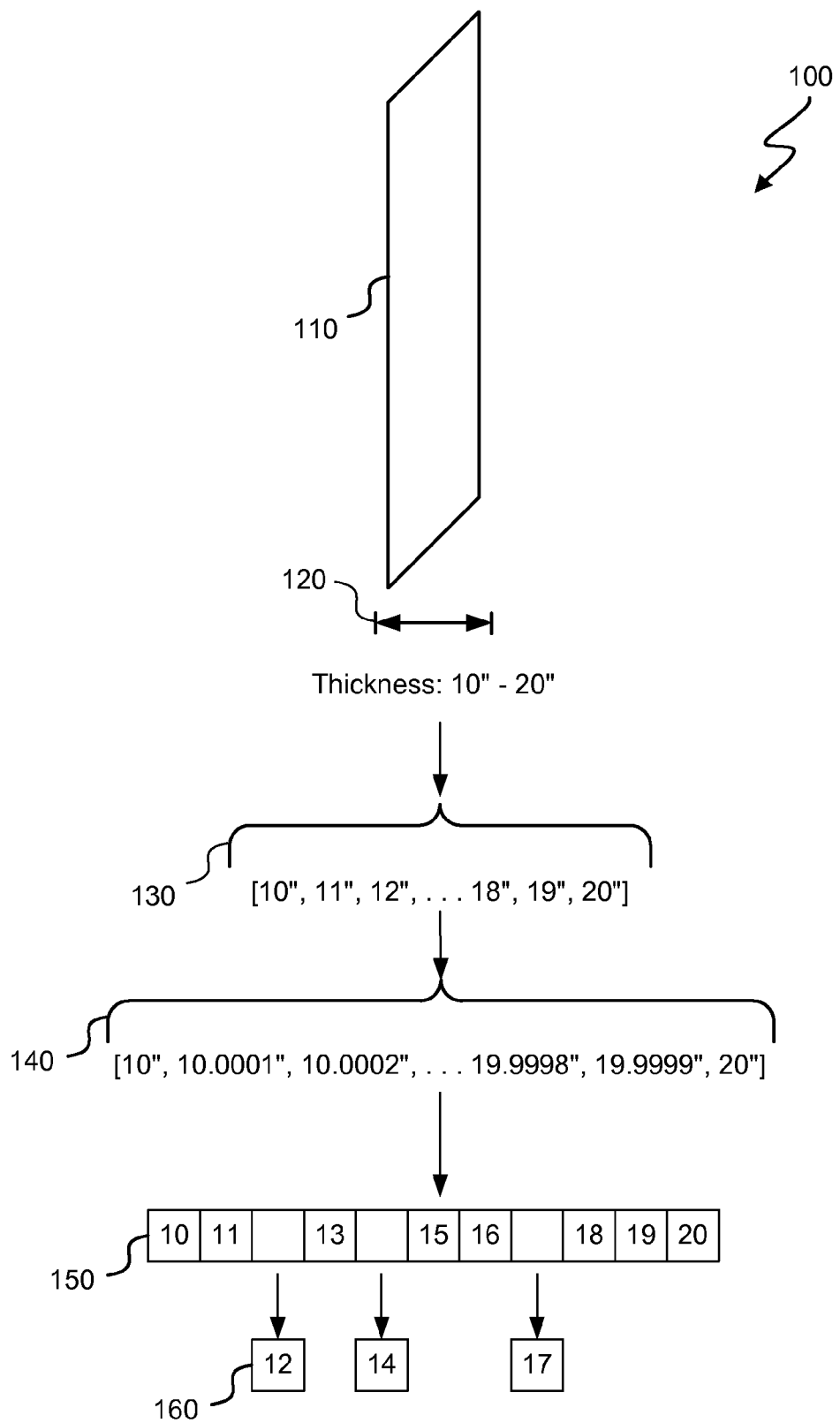
FIG. 1 illustrates one example of mapping a constraint variable to a finite range of sequential values.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

When solving constraint problems, each variable represented in the problem may be modeled as a solution space comprising a range of discrete values. Relationships between these variables may be used to constrain the possible solution spaces for each variable. Finding a set of solutions for the problem may often involve subjecting the solution spaces of each variable to limiting algorithms that enforce the various constraint rules until the domain of each variable is limited to a single value without violating any of the constraints. Because of the complexity of the algorithms involved, and because of the large number of possible solution values, software programs known as constraint solvers may be used to both represent the variable solution spaces and run the solver algorithms.

To solve a constraint problem using a computer system, the domain of one or more of the variables may be converted into a range of finite sequential values that may be represented digitally. FIG. 1 illustrates the partial setup 100 of a constraint problem that includes a variable, for example, for the thickness 120 of a piece of glass 110 in a wave transmission application. The domain of the variable for the thickness 120 of the glass 110 could be between 10 inches and 20 inches. To solve this problem using a constraint solver in a computer system, the domain of the thickness 120 could be mapped to a first range 130 of finite sequential values 130 representing incremental thicknesses 120 of the glass 110, such as {10", 11", 12", . . . 18", 19", 20"}. Values with this range could then be systematically removed according to various algorithms known in the art until only an optimal solution remains.

While the first range of finite sequential values 130 in this simple example only includes 10 values, more complex constraint problems may contain millions of values. The size of a variable's domain may increase, and/or there may need to be increased resolution in the range of values. For example, the resolution of a second range of values 140 described above could be increased, resulting in a sequence with thousands of values, such as {10", 10.0001", 10.0002", . . . 19.9998", 19.9999", 20"}. Furthermore, a constraint problem may contain many different variables, each having its own range of values that need to be analyzed in order to arrive at an optimal solution. Therefore, one challenge is to provide a system that allows for the representation of and reasoning over very large numeric sets, and to do so in a manner that allows for optimal performance while minimizing memory utilization.

In order to run a constraint solver algorithm, it is usually advantageous to represent the domain of each variable within a data structure stored in a memory. One embodiment stores the range of discrete numbers used to represent the domain of each variable in a data structure. Then, as values are eliminated by the algorithm as possible solutions, those values are removed from the data structure. When the solver algorithm finishes running, any values that remain in the data structure may be considered to not violate any of the constraint rules in conjunction with the values for the other variables, and may thus be considered possible solutions. For example, in FIG. 1, the range of finite sequential values 130 comprising the values of {10", 11", 12", . . . 18", 19", 20"} may be stored in a data structure such as an array 150. As values 160 are removed from the data structure, the remaining values may be considered candidates for solutions. Eventually, all of the values in the array 150 may be removed that violate the constraints, and the remaining values may be considered to be solutions. Alternatively, if no values remain, then no solutions may exist.

In another embodiment, the constraint solver algorithm may add values to a data structure as they are eliminated from the solution space for each variable. For example, a simple range may be used to describe the domain of each variable, and then add the values that are removed from that range in a data structure. For example, in FIG. 1, the first range 130 representing the thickness of the thickness 120 of the piece of glass 110 may be represented as {10 . . . 20}. Instead of storing each integer value between 10 inches and 20 inches in a data structure, the constraint solver may store values in the data structure as they are removed from the range. Thus, values 160 that are removed such as {12}, {14}, and {17} would be inserted in to the data structure. When the constraint solver finished its iterations, the solutions could be identified by the gaps in the data structure. Or, if no gaps are found in the data structure, then no solutions may exist.

Either of these methods (removing values from or adding values to a data structure) may benefit from the use of a data structure that provides efficient access to values and minimizes the use of memory space. One method of representing ranges of values in a constraint problem is the use of bit vectors. Here, each value may be represented by a single bit in a bit vector. Each bit is associated with a single value in the range, and the "1" or "0" designates whether the value has been excluded from the solution space by the solution algorithm. However, the bit vector method, along with other similar methods, requires at least one memory location to represent each value. Therefore, as the size of the range expands, the size of the bit vector increases at the same rate of O(n). This may render bit vectors unsuitable to efficiently represent large data sets.

In addition to the solution methods described above, embodiments of the present invention provide systems, methods, and devices that may be used to compactly represent large ranges of sequential numeric values. A data structure may be used to represent sub-ranges within a finite range of sequential values. In contrast to existing range/interval trees, these embodiments use a data structure that is designed to optimize its time and space complexity by consolidating adjacent and overlapping ranges within the set. This self-optimizing data structure may consolidate redundant values into single nodes. Therefore, single nodes within the data structure may store multiple sequential values by representing them as a single range. Some embodiments efficiently represent ranges by storing an upper and lower bound on the range, with access methods that may be designed around the degree of quantization used to define the spacing between sequential values (i.e., integers, even numbers, etc.).

The self-optimizing data-structure discussed herein may be implemented in any existing data storage mechanism. These may include, but are not limited to, trees, graphs, arrays, vectors, lists, linked lists, queues, stacks, heaps, hash tables, and/or the like. Various embodiments may use a binary tree structure wherein each node in the binary tree stores a value or a range of values. These binary trees may use a balancing procedure to minimize the time associated with traversing the tree when adding values. Balancing procedures such as those found in AA tress, AVL trees, red-black trees, scapegoat trees, splay trees, treaps, and/or the like may be used in conjunction with certain embodiments. For example, one embodiment utilizes a red-black tree configuration to balance the tree nodes as they are added and removed from the data structure.

Figure 2:
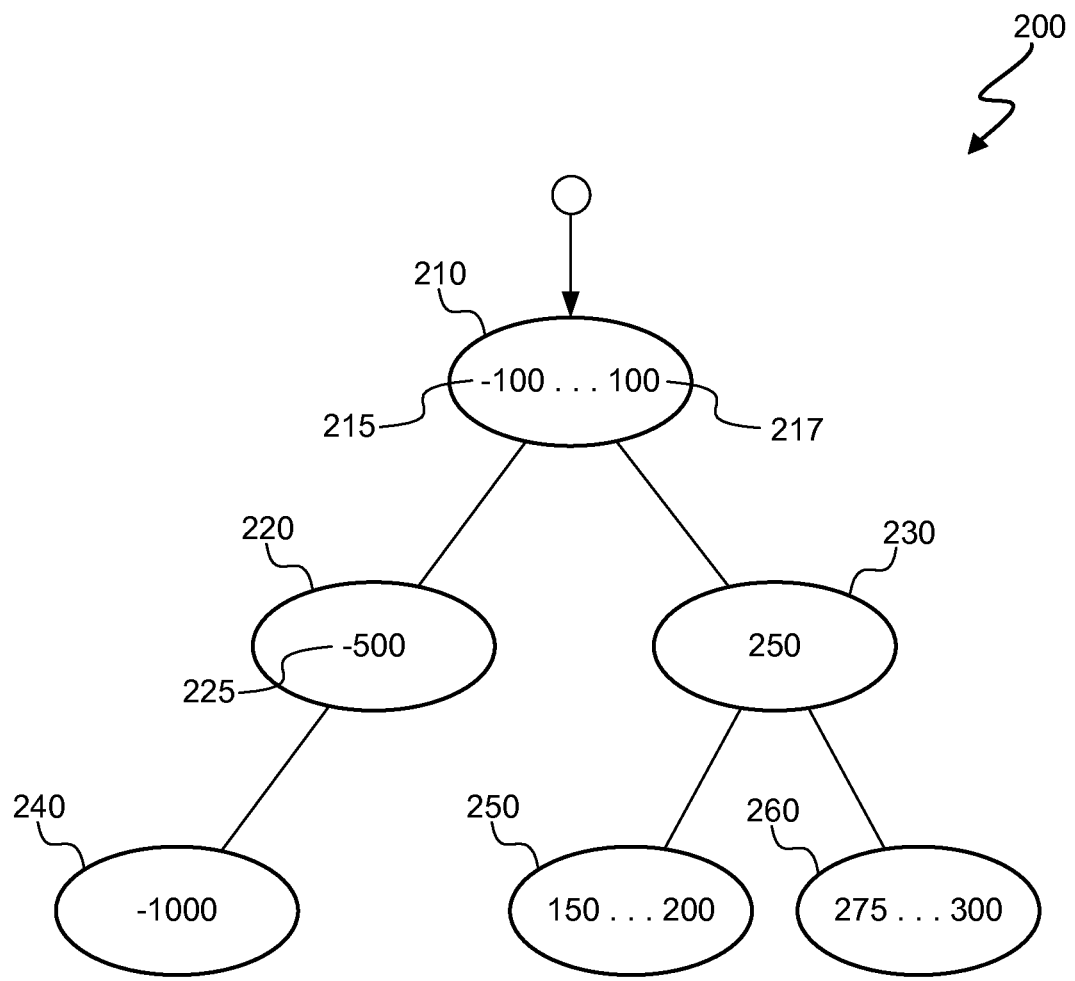
FIG. 2 illustrates one embodiment of a self-optimizing data structure.

FIG. 2 illustrates one embodiment of a self-optimizing data structure 200. Each of the nodes in the data structure 200 may represent either a single value or range of sequential values. Nodes 210, 250, and 260 of the data structure 200 represent ranges of sequential values. For example, node 210 represents the integers between -100 and 100 inclusive, node 250 represents the integers between 150 and 200 inclusive, and node 260 represents the integers between 275 and 300, inclusive. These ranges may be represented using an upper bound and a lower bound. For example, node 210 includes a lower bound 215 and an upper bound 217 that represent the boundaries of the represented range. Note that in FIG. 2, the data structure 200 is represented as a binary tree structure. This is merely illustrative, and the data structure 200 may be implemented as any other data of data structure that could perform similar functions.

In addition to nodes 210, 250, and 260 representing ranges of numbers, nodes, 220, 230, and 240 represent single values. Node 220 represents the value of {-500}, node 230 represents the value of {250}, and node 240 represents the value of {-1000}. The single values may be represented within the node as a single value. For instance, node 200 may store the value of -500 as a single value {225} in a single memory location. However, in some embodiments, the single value 225 may be stored in the same type of node used to represent a range of numbers. Although not shown explicitly in FIG. 2, the single value 225 of {-500} stored in node 220 may be represented by an upper and lower bound. Thus, node 220 could store an upper and lower bound, with each bound set to the same single value 225 of {-500}. Therefore, a node that stores a single value may be considered to store a range of values, wherein the range is represented by the interval of {-500 . . . -500}, which amounts to a single value. This type of structure may simplify operations by allowing the tree 200 to use a single node type to store all ranges of values, whether they include a single value or a sequence of multiple values.

As used herein, the term "range" may include both single values and multiple values. Therefore, when a range is selected from a variable's domain, this may include both single values and multiple sequential values. Likewise, when comparing the range of a selection to the range of one or more nodes in a data structure, this comparison may include comparing both single values and ranges of multiple values.

Adding nodes to the data structure 200 that do not overlap with any of the ranges already in the tree may result in the simple addition of nodes to the tree 200. This process may be similar to the process of adding nodes to any other binary tree structures. However, adding nodes to the tree 200 that are adjacent to existing nodes may involve a more complex procedure. As used herein, the term "adjacent" means that the two values or ranges follow one after the other in a finite sequence of values that represent a solution space for a variable in a constraint problem. For example, if a finite sequence of values includes even integers {-2, 0, 2, 4, 6, 8, 10}, then the range {0 . . . 4} would be adjacent to the single values of {-2} and {6} The range {0 . . . 4} would also be adjacent to the ranges {6 . . . 8} and {6 . . . 10}. However, the range {0 . . . 4} would not be adjacent to the single values of {8} and {10}, and would not be adjacent to the range {8 . . . 10}. Thus, adjacency should be considered in the context of the finite sequence of values. In the data structure 200 in FIG. 2, the finite sequence of values may be all of the integers between a value less than or equal to -1000 and greater than or equal to 300.

Figure 3:
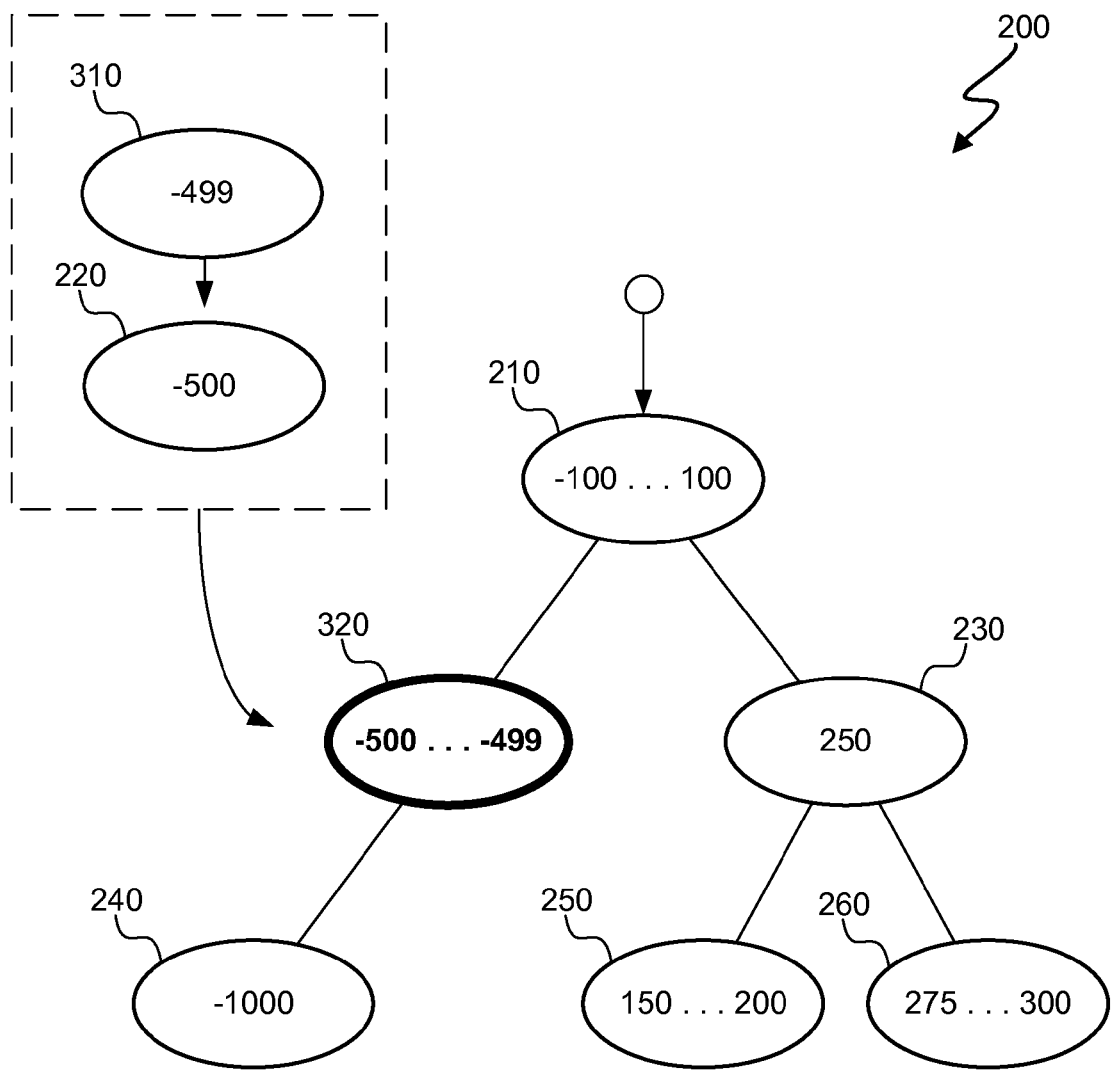
FIG. 3 illustrates the addition of a node that is adjacent to an existing node according to one embodiment of a self-optimizing data structure.

FIG. 3 illustrates the addition of a node that is adjacent to an existing node in the embodiment of a self-optimizing data structure 200. Node 310 representing a single value of {-499} may be added to the data structure 200. In this case, the value of {-500} represented by node 220 is adjacent to the value of {-499} represented by node 310 that is being added to the data structure 200. Instead of adding a new node representing {-499}, this value may be added to node 220 with the adjacent value of {-500}. The upper bound of node 220 may be changed from {-500} to be {-499}, while the lower bound may stay at {-500}. Thus the upper bound of node 220 may change as reflected by node 320 in FIG. 3.

This same procedure may be followed for adding a single value that is adjacent to a range of values represented by a node in the tree. For example, (not shown) the value of -101 would be adjacent to the range of {−100 . . . 100} represented by node 210. If the value of {−101} were to be added to the data structure 200, the lower bound of node 210 could be change to be {−101} instead of forming a new node. Node 210 would then represent the range of {−101 . . . 100}. It is worthy of note that in these last two cases (adding adjacent single values) the number of values represented by the data structure 200 is increased without increasing the size or complexity of the data structure 200.

Figure 4:
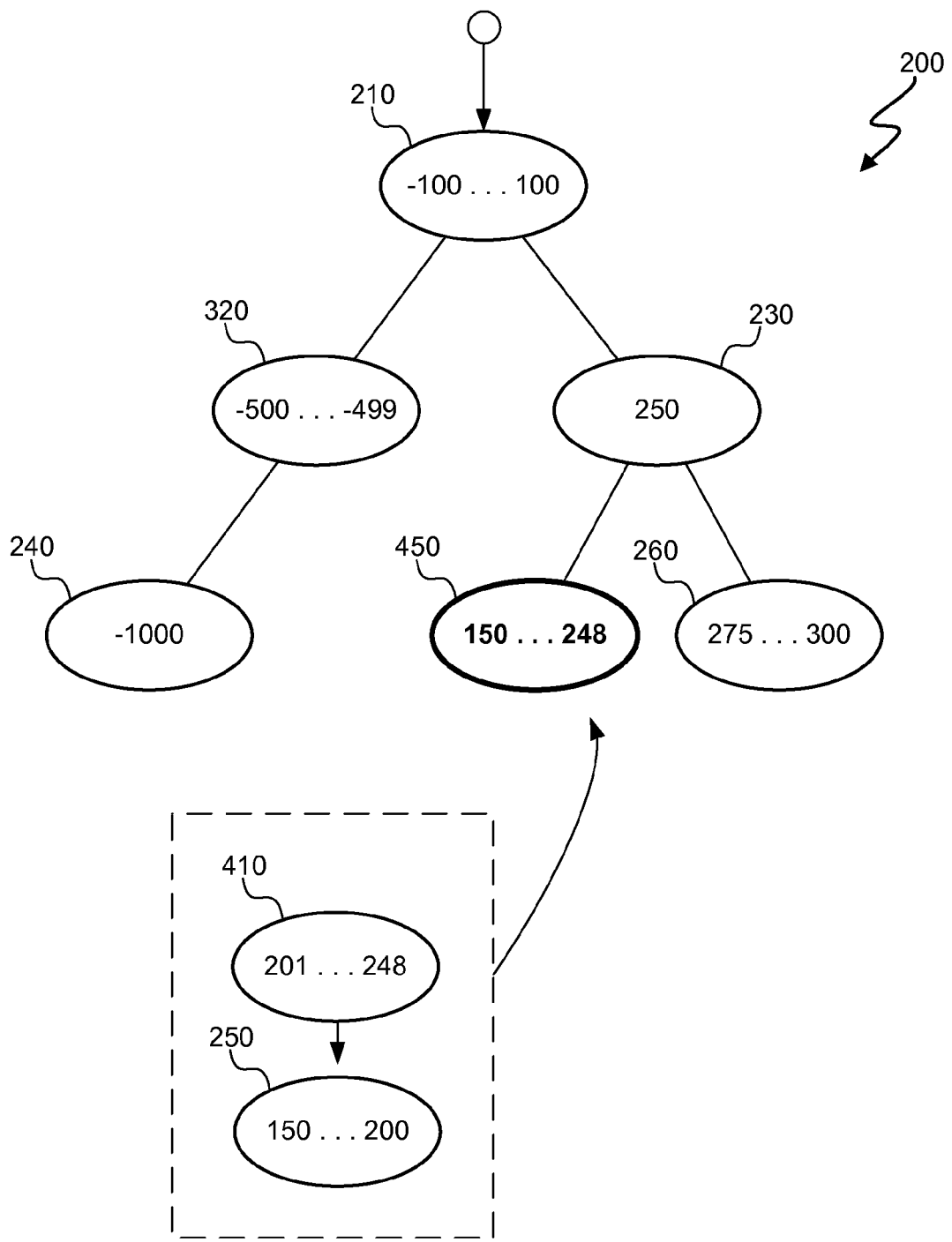
FIG. 4 illustrates the addition of a range of values to that is adjacent to an existing node according to one embodiment of a self-optimizing data structure.

FIG. 4 illustrates the addition of a range of values that is adjacent to an existing node in the embodiment of a self-optimizing data structure 200 shown in FIG. 3. Node 410 representing a range of {201 . . . 248} may be added to the data structure 200. In this case, the range of {150 . . . 200} represented by node 250 is adjacent to the range of {201 . . . 248} represented by node 410 that is being added to the data structure 200. Instead of simply adding node 410 to the data structure 200, the range of {210 . . . 248} may be added to node 250's adjacent range. The upper bound of node 250 may be changed from {200} to be {248}, while the lower bound may stay at {150}. The changed upper bound of node 250 may change as reflected by node 450 in FIG. 4.

This same procedure may be followed for adding a range that is adjacent to a single values represented by a node in the data structure 200. For example, (not shown) the range of {−999 . . . 990} could be adjacent to the single value of {−1000} represented by node 240. If the range of {−999 . . . 990} were to be added to the data structure 200, instead of forming a new node, the upper bound of node 240 could be changed from {−1000} to be {−990}. Node 250 would then represent the range of {−1000 . . . −990}. Again, in these last two cases (adding adjacent ranges) the number of values represented by the data structure 200 is increased, sometimes significantly so, without increasing the size or complexity of the data structure 200.

Figure 5:
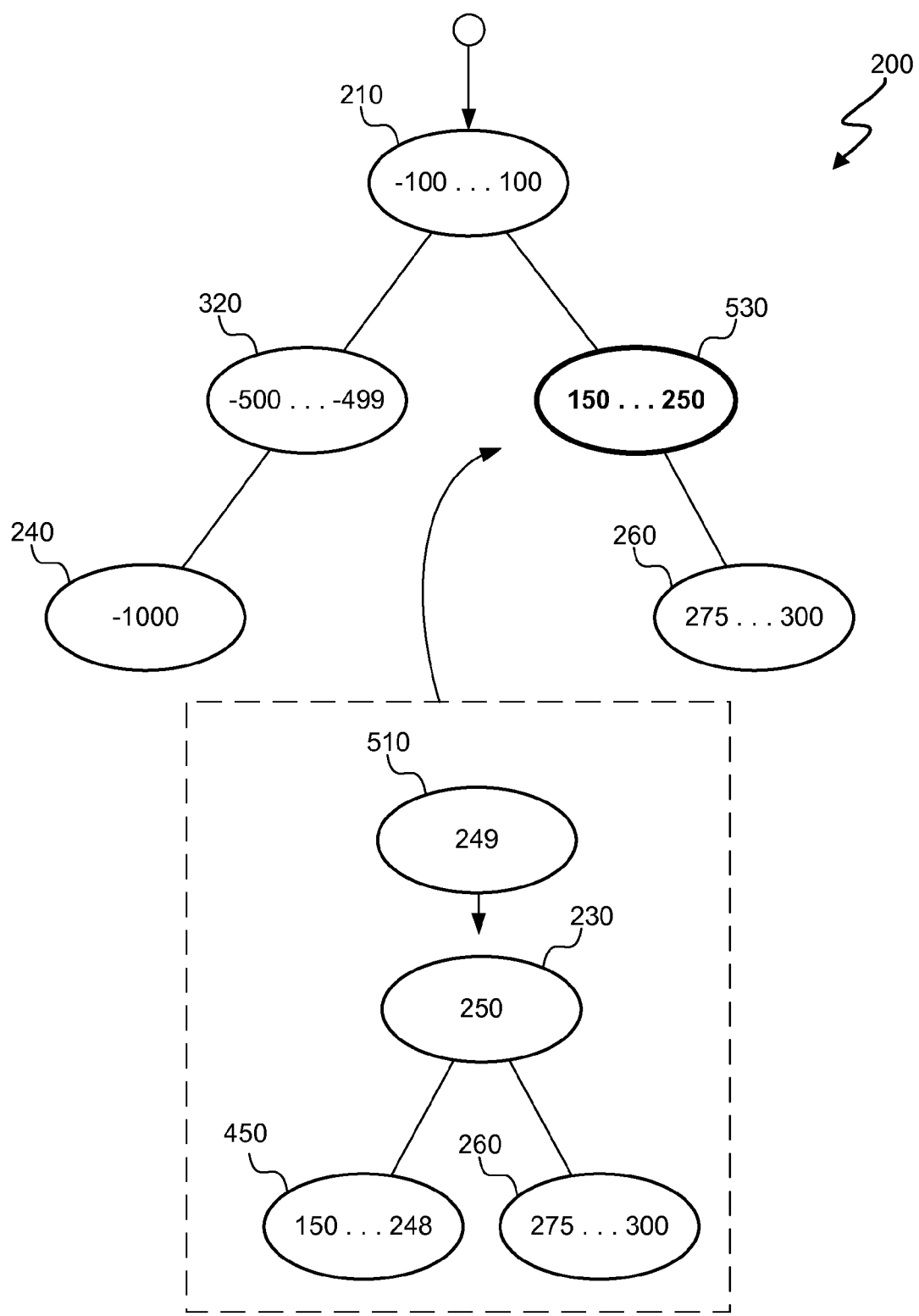
FIG. 5 illustrates the addition of a single value to that is adjacent to two existing nodes according to one embodiment of a self-optimizing data structure.

In some cases, adding single values or ranges to a self-optimizing data structure may in fact decrease the size and complexity of the tree. FIG. 5 illustrates the addition of a single value that is adjacent to two existing nodes in an embodiment of a self-optimizing data structure 200. Node 510 represents the single value of {249}, which is adjacent to the single values of {250} represented by node 230 and the range of {150 . . . 248} represented by node 450. By inserting a node with a value that is adjacent to two different existing nodes, the new node may collapse all three nodes into a single node representing a range of values. Here, the range of {150 . . . 248} and the single values of {249} and {250} are all adjacent. These the nodes may collapse into a single node 530 representing the range of {150 . . . 250}. By determining that a new node is adjacent to other existing nodes, the complexity and size of the data structure may be reduced. This is a significant improvement over other types of data structures that may exist.

Figure 6:
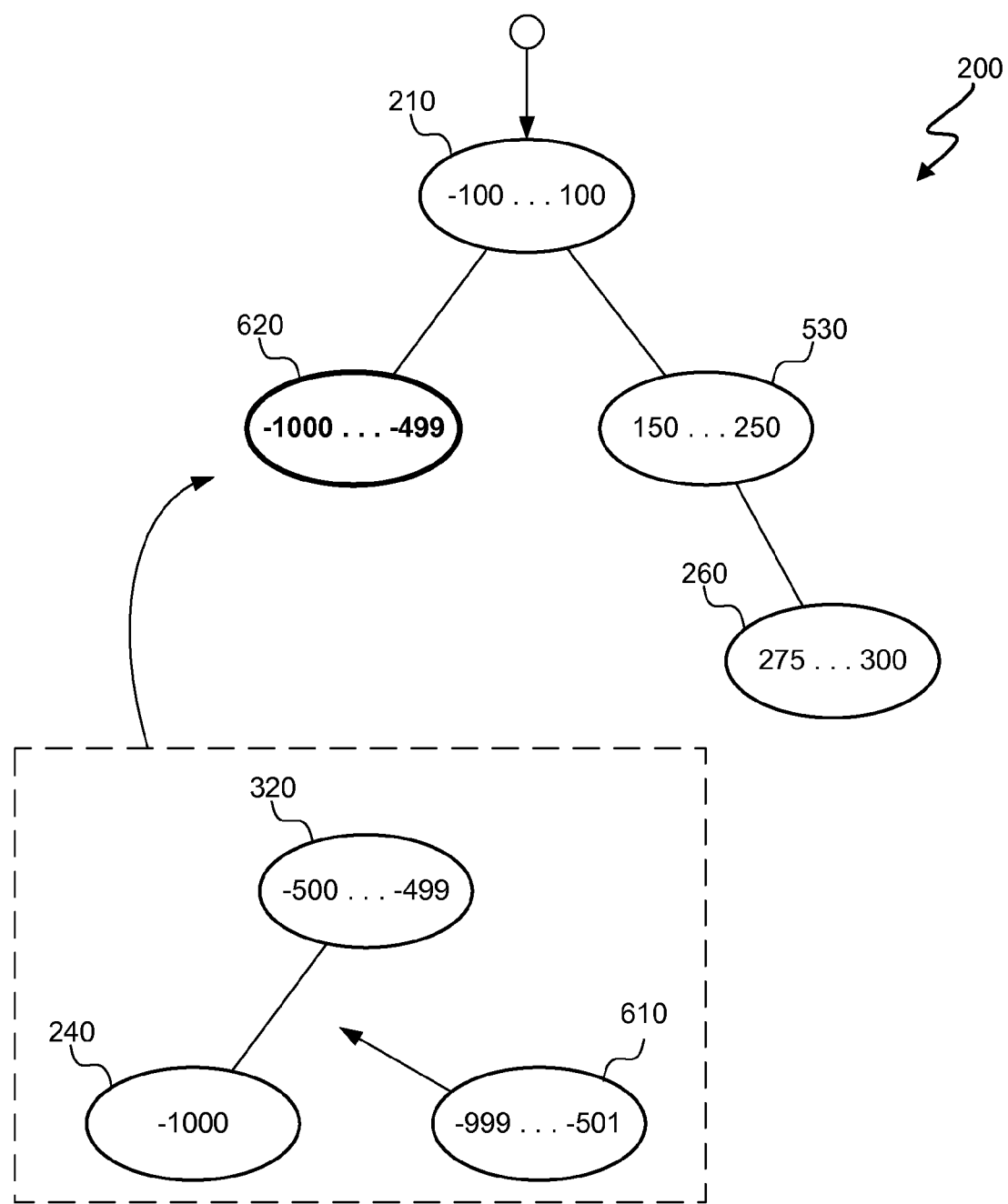
FIG. 6 illustrates the addition of a range of values that are adjacent to two existing nodes according to one embodiment of a self-optimizing data structure.

Similarly, if a new node representing a range of values is added to the data structure 200, and the new node represents a range of values that is adjacent to the values of two existing nodes, each of these three nodes may be collapsed into a single node. FIG. 6 illustrates the addition of a range of values that are adjacent to two other nodes in the data structure 200. New node 610 representing a range of values of {−999 . . . 501} is an example of another type of node that may be added to the data structure 200. The range represented by the new node 610 is adjacent to the value of {−1000} represented by node 240, and it is adjacent to the range of {−500 . . . −499} represented by node 320. Because each of these values and/or ranges are adjacent, these three nodes may be collapsed into a single node 620 representing the range of {−1000 . . . −499}. Again, this operation adds 499 values to the tree, yet reduces the size and complexity of the tree by at least one node.

Figure 7:
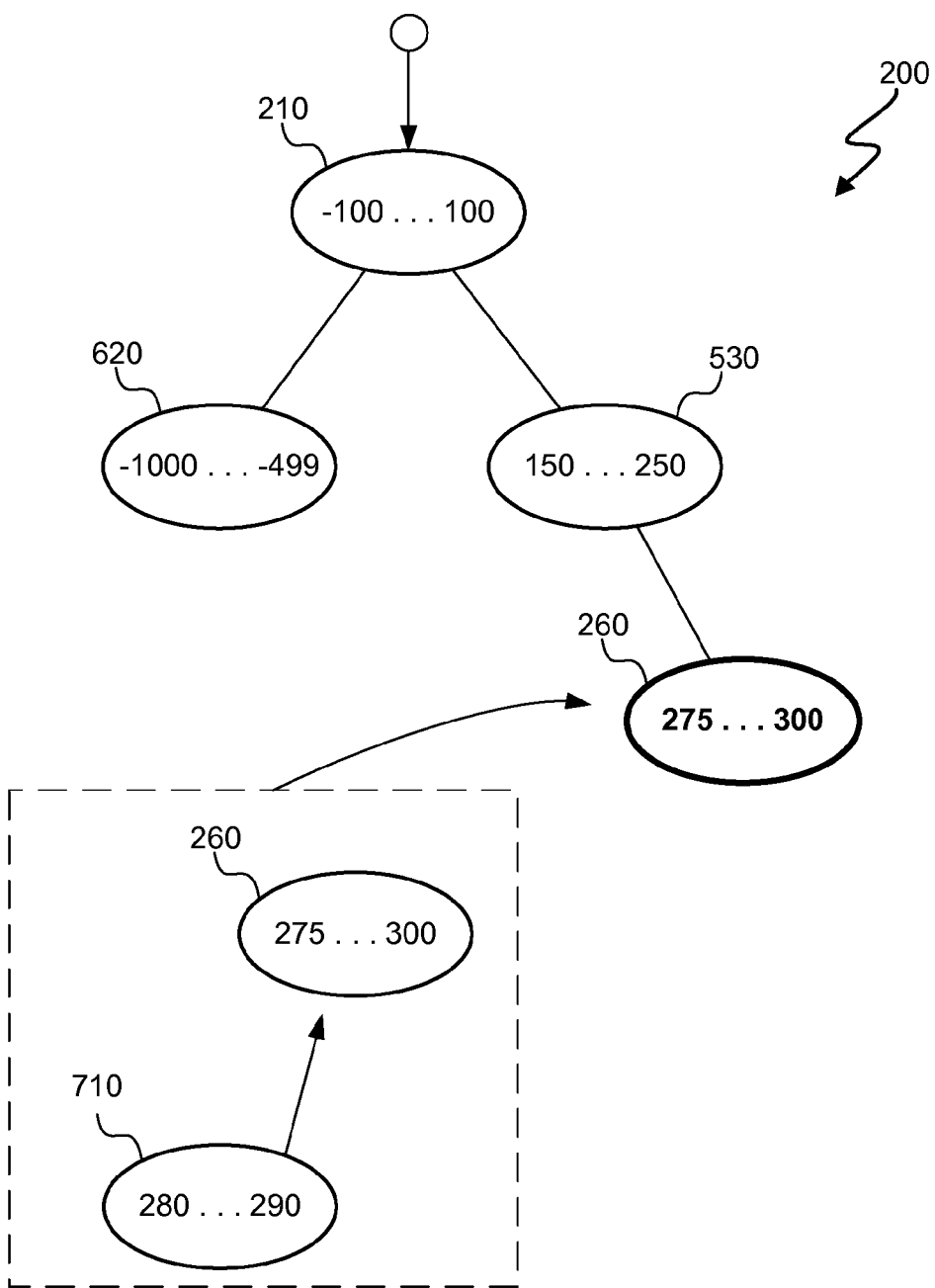
FIG. 7 illustrates an example of adding a range that is within an existing node according to one embodiment of a self-optimizing data structure.

In addition to determining whether new nodes contain adjacent values or ranges, some embodiments also determine whether new nodes contain values or ranges that overlap with one or more existing nodes in the data structure. Ranges can overlap in at least three different ways. The first way that ranges can overlap is for the added range to fall within an existing range. FIG. 7 illustrates an example of adding a range that is within one of the existing nodes. A new node 710 representing the range {280 . . . 290} may be added to the data structure 200. This new range falls completely within the range of {275 . . . 300} represented by node 260. Therefore, addition of the new node 710 may have no effect on the tree because this range is already represented by the existing node 710.

There are a number of ways to determine whether the range of the new node 710 falls within the existing node 260. For example, in one embodiment, it may be determined whether the upper bound of the new node 710 is less than or equal to the upper bound of the existing node 260. Also, it may be determined whether the lower bound of the new node 710 is greater than or equal to the lower bound of the existing node 260. Referring to the upper and lower bounds generically as a first bound and a second bound, another embodiment may determine whether both the first and second bounds of the new node fall within the first and second bounds of the existing node. Various embodiments may use different mathematical operators and programming language features to make this determination.

As used herein, the terms "first bound" and "second bound" are used to merely designate that two distinct bounds may exist. However, these term do not always indicate an ordering of these bounds. For example, the first bound may be the upper bound and the second bound may be the lower bound in some embodiments, and vice versa.

Figure 8:
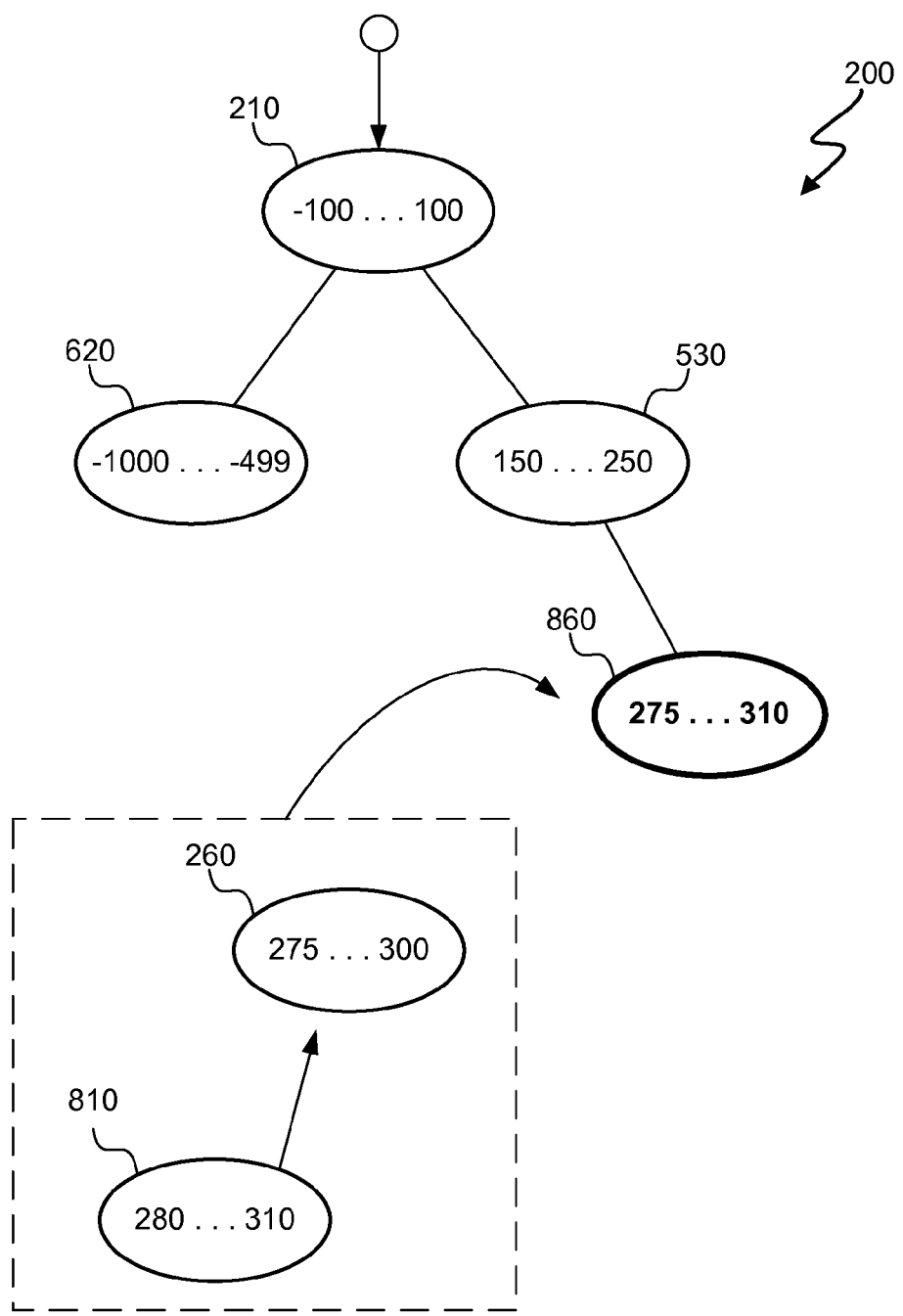
FIG. 8 illustrates an example of adding a range that partially overlaps with the range of an existing node according to one embodiment.

A second way for the range of a new node to overlap with the range of an existing node is for the two ranges to partially overlap, such that the intersection of the two ranges is less than the complete range of either node. FIG. 8 illustrates and example of adding a range that partially overlaps with the range of an existing node 260. A new node 810 representing the range {280 . . . 310} may be added to the data structure 200. This new range partially overlaps with the range of {275 . . . 300} represented by node 260. Adding the range of the new node 810 may not require the addition of an actual node to the tree, because one of the bounds of the existing node 260 may be updated to reflect the combined range. In this case, the upper bound of the existing node 260 may be updated to be {310}, which would effectively incorporate the added range to the updated node 860. As was the case with adding adjacent ranges/values, adding partially overlapping ranges can add a significant number of values to the data structure 200 without adding any complexity or size.

There are in number of ways to determine whether the range of the new node 810 partially overlaps with the existing node 260. For example, in one embodiment, it may be determined that the upper bound of the new node 810 is greater than the upper bound of the existing node 260. Also, it may be determined that the lower bound of the new node 810 is within the range of the existing node 260 (i.e., greater than or equal to the lower bound and less than or equal to the upper bound). Referring to the upper and lower bounds generically as a first bound and a second bound, another embodiment may determine whether either the first or second bound of the new node falls between the first and second bounds of the existing node, and then whether the other bound of the new node 810 falls outside of the range of the existing node 260. Various embodiments may use different mathematical operators and programming language features to make this determination. Additionally, other mathematical or logical functions may also be used in order to make this determination as effectively as possible.

Figure 9:
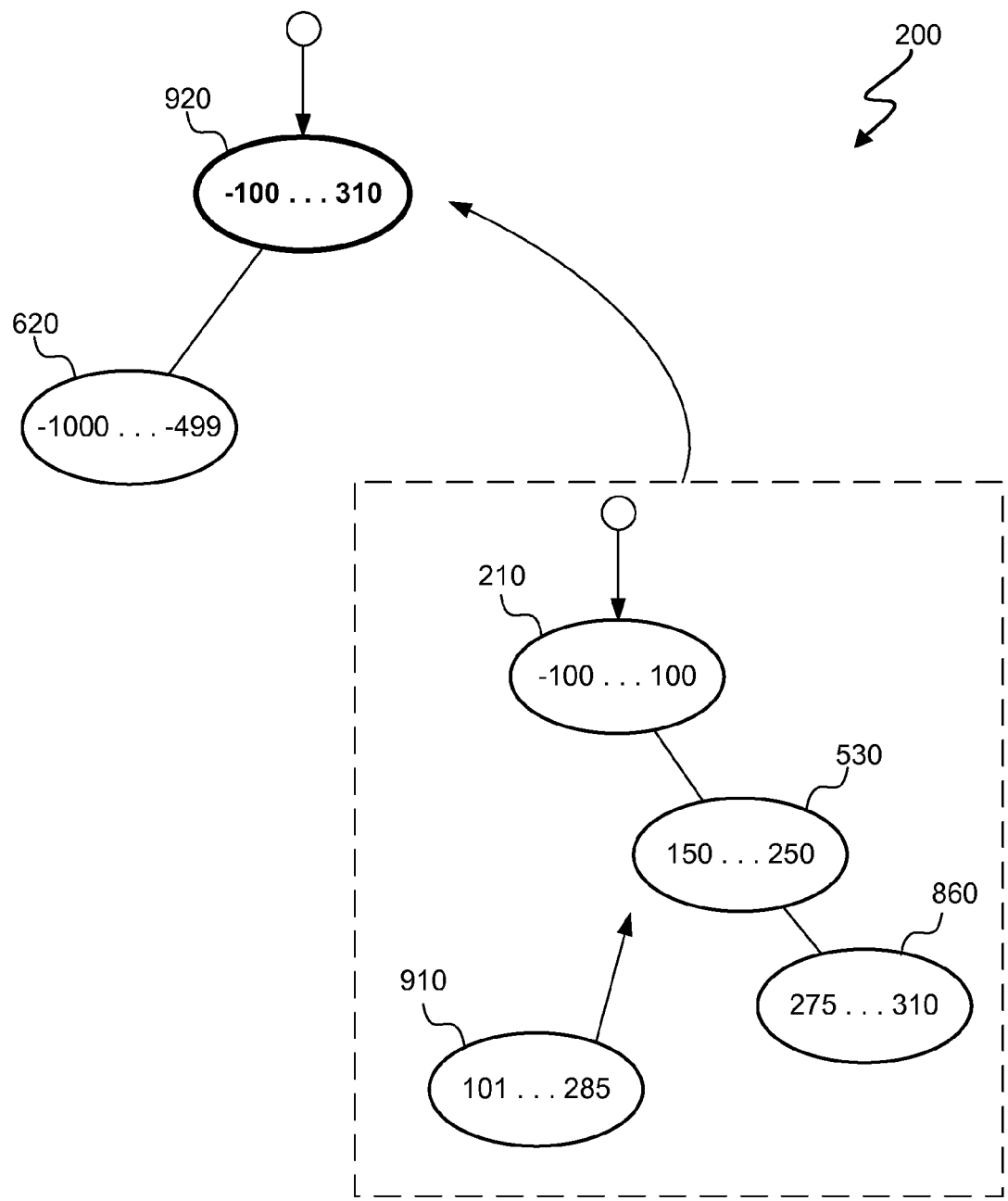
FIG. 9 illustrates an example of adding a range that completely overlaps with the range of an existing node according to one embodiment.

A third way for the range of a new node to overlap with the range of an existing node is for the new range to completely overlap the existing node's range. In case where the new node completely overlaps only a single node, the bounds of the existing node may be simply updated to reflect the bounds of the new node. More complex situations may arise wherein the new node overlaps multiple nodes. FIG. 9 illustrates an example of adding a range that completely overlaps with the range of an existing node 530. A new node 910 representing the range {101 . . . 285} may be added to the data structure 200. This new range completely overlaps with the range of {150 . . . 250} represented by node 530. Additionally, the range of the new node also partially overlaps with the range of {275 . . . 310} represented by node 860, and the range of the new node 910 is adjacent to the range of {-100 . . . 100} represented by node 210. In this case, each of the three existing nodes 210, 530, and 860 that are adjacent to or overlap with the new node 910 may be collapsed into one node 920 with a range of {-100 . . . 310}. It should be clear that adding node 910 with a range that overlaps or is adjacent to the ranges of multiple nodes in the tree may significantly reduce the complexity and/or size of the tree while adding a large number of values.

Depending on the type of data structure various embodiments may use, there may be different methods for updating the data structure when a new range overlaps or is adjacent to multiple existing nodes. For a data structure 200 that uses a balanced binary tree, the process may involve updating the bounds of one of the existing nodes. In the example of FIG. 9, the upper bound of node 201 was set to the upper bound of the highest node 860 range that partially overlapped with the range of the new node 910. Additionally, the nodes, 530 and 860, that were completely overlapped by the range of the new node 910 were removed from the tree. For a tree such as data structure 200, removing nodes and adjusting the bounds of other nodes may also require rearranging some of the tree's branches and performing a balancing algorithm such as those found in a red-black binary tree. Other types of data structures may use different methods to balance or otherwise increase the efficiency of accessing their data.

There are a number of ways to determine whether the range of the new node 910 completely overlaps with the existing node 530. For example, in one embodiment, it may be determined that the upper bound of the new node 910 is greater than the upper bound of the existing node 530. Next, it may be determined that the lower bound of the new node 910 is less than the lower bound of the existing node 260. Referring to the upper and lower bounds generically as a first bound and a second bound, another embodiment may determine that the first bound of the new node 910 is less than both bounds of the existing node 530, and that the second bound of the new node 910 is greater that both bounds of the existing node 530. Various embodiments may use different mathematical operators and programming language features to make this determination. Additionally, other mathematical or logical functions may also be used in order to make this determination as effectively as possible.

It should be clear that there are multiple ways for a new range that is added to the data structure to reduce the number of nodes in the tree. Some of these have been discussed above, and others should be readily apparent in light of this disclosure. For example, a new range could be adjacent to two existing ranges; the new range could be adjacent to one existing range and partially overlap another existing range; the new range could be adjacent to one existing range and completely overlap a second existing range; the new range could partially overlap two existing ranges; the new range could partially overlap one existing range and completely overlap another existing range; and the new range could completely overlap two existing ranges. This listing is merely exemplary, and is not meant to be limiting. For example, the new range may be adjacent to or overlap three or more existing ranges. In most cases, the more existing ranges that are affected by the new range, the more the complexity and size of the tree may be reduced.

Figure 10:
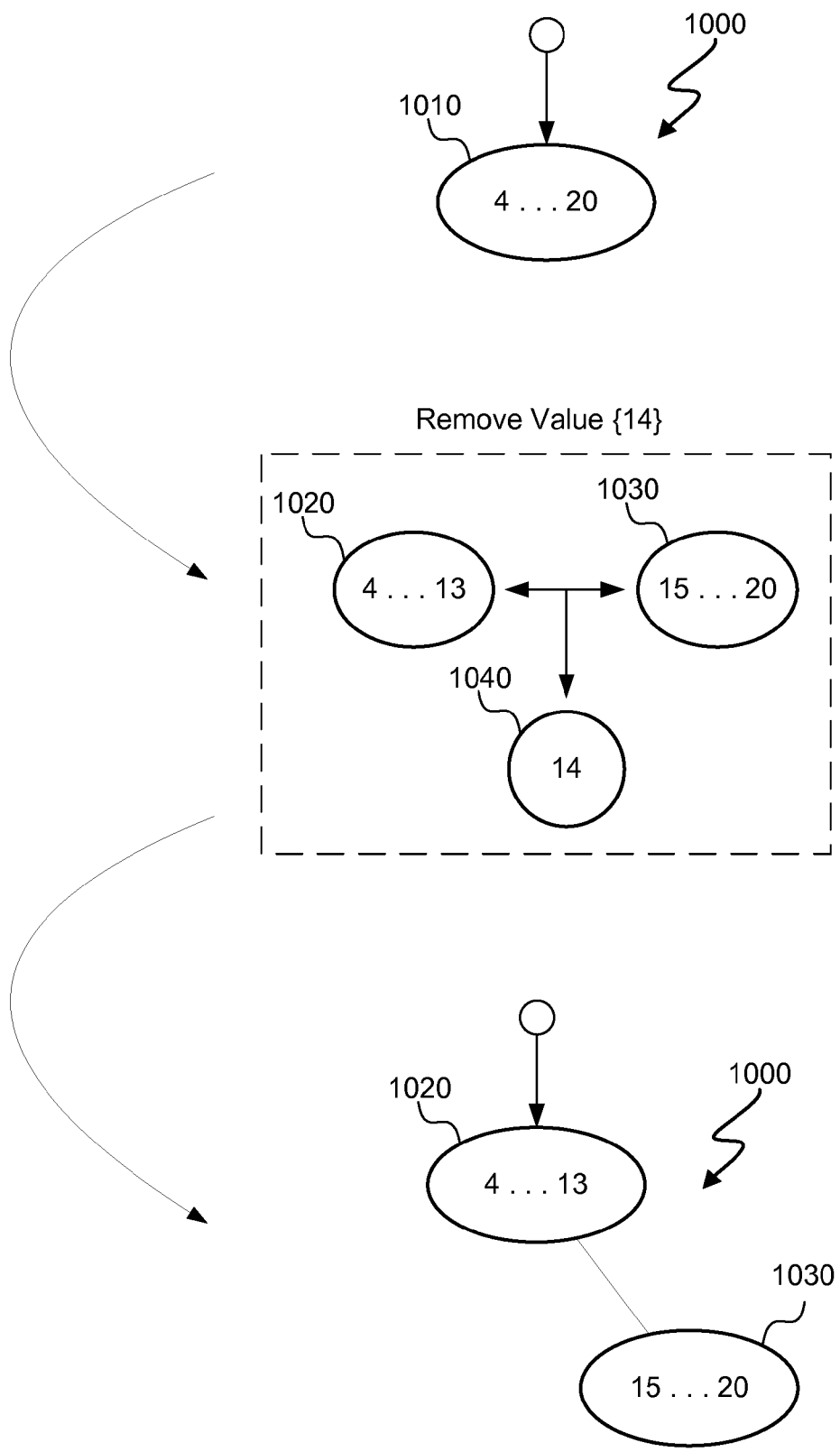
FIG. 10 illustrates an example of a self-optimizing data structure representing a single range of values, and the removal of a value according to one embodiment.

As discussed above, rather than adding values to a data structure, some embodiments may remove values from the data structure as they are eliminated as possible solutions by a constraint solver algorithm. To accommodate this type of solution procedure, embodiments of the self-optimizing data structure may accommodate the removal of values and/or ranges. FIG. 10 illustrates an example of a self-optimizing data structure 1000 representing a single range of values. Again, in this case the self-optimizing data structure 1000 is represented in the figures as a binary tree; however, this is not meant to be limiting. The self-optimizing data structure 1000 may also be implemented as a number of other data structures according to various embodiments. These may include, but are not limited to, trees, graphs, arrays, vectors, lists, linked lists, queues, stacks, heaps, hash tables, and/or the like. The root node 1010 of the data structure 1000 represents the range of {4 . . . 20}. This may correspond to the domain of a variable in a constraint problem. The finite range of sequential values may be the integers between the values of {4} and {20}. The constraint solver may use the data structure 1000 to represent the values that are still possible candidates to be solutions for the variable.

As the solver iterates through the possible solutions, the constraints of the problem may eliminate single values or ranges of multiple values from the solution space. When this occurs, these values may be removed from the data structure 1000. For example, the constraint solver may eliminate the value of {14} represented by node 1040. Removing this value may split the root node 1010 into two nodes, namely nodes 1020 and 1030. In the binary tree example of FIG. 10, the either of the two new nodes 1020 and 1030 may remain the root node, while the other could become a child of the new root node. Note that in this case, removing a value from the data structure 1000 actually increased the size and complexity of the data structure 1000. Generally, removing single values from a data structure comprised mostly of nodes representing ranges will increase the size of the data structure until single values begin to predominate. At that point, removing single values will again tend to reduce the size and/or complexity of the data structure.

Figure 11:
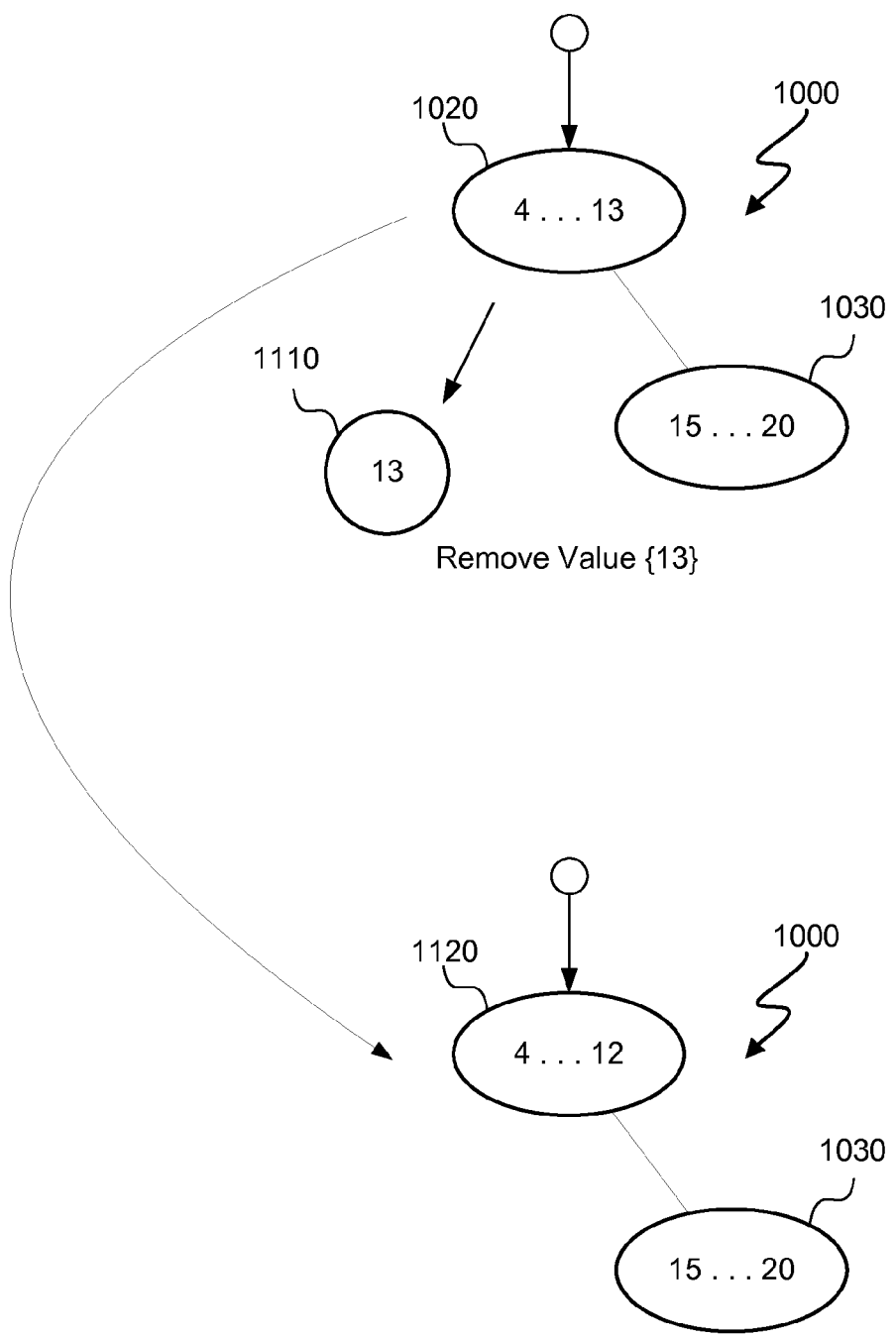
FIG. 11 illustrates the removal of a value from a self-optimizing data structure according to one embodiment.

FIG. 11 illustrates the removal of another value from the data structure 1000. In this case, the single value {13} represented by node 1110 that is being removed by the data structure 1000 may be an upper or lower bound of a range represented by an existing node. Because {13} is also the upper bound of the range {4 . . . 13} represented by node 1020, removing {13} from the data structure 1000 may only require adjusting the upper bound of the existing node 1020 to be equal to the removed value. Thus, node 1020 may be updated, and the range of {4 . . . 12} may be represented by updated node 1120. Of course, although not shown in FIG.

11, this same analysis may hold true for single values that equal a lower bound of an existing node. Broadly, any removed value that equals a first or second bound of an existing node may be removed by updating the corresponding bound of the existing node.

Similarly, removing a range of values from the data structure 1000 may also have a similar effect as removing a single value. For example (not shown) if instead of removing the value of {13} from the data structure 1000 in FIG. 11, a range of {13 . . . 14} were removed, the effect on the data structure 1000 may ultimately be the same. Of note is the fact that in both of these cases where values—whether multiple or single values—are removed that share a bound with an existing node, the overall complexity and/or size of the data structure 1000 should not increase.

Figure 12:
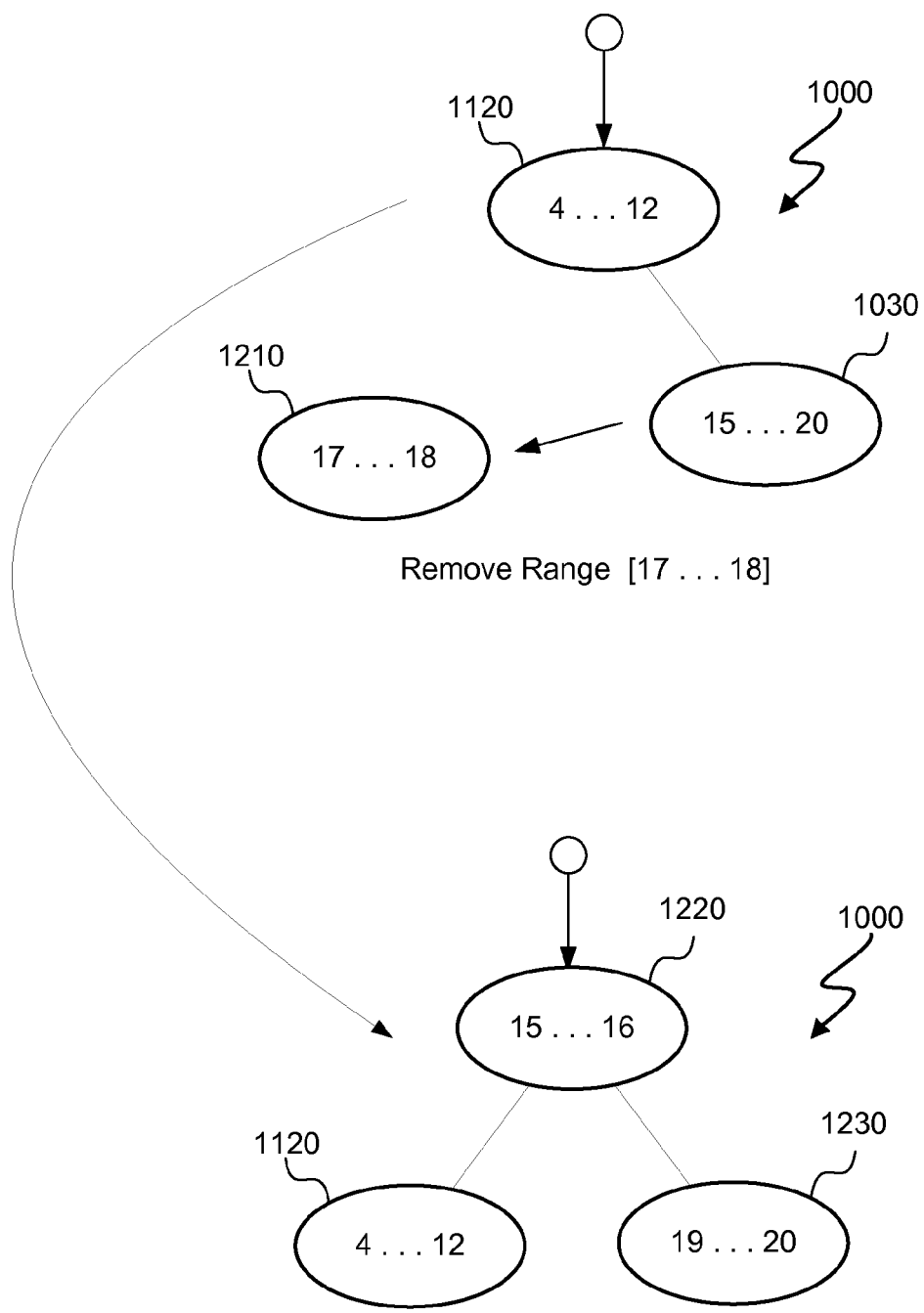
FIG. 12 illustrates an example of removing a range of values from a self-optimizing data structure according to one embodiment.

FIG. 12 illustrates an example of removing a range of values from the data structure 1000, according to one embodiment. In this case, the range of values {17 . . . 18} represented by node 1210 may be removed, which splits one of the ranges of an existing node into two parts. The range {17 . . . 18} occurs completely within the range {15 . . . 20} represented by node 1030. Node 1030 may be split into two nodes: node 1220 representing the range {15 . . . 16} and node 1230 representing range {19 . . . 20}. Although not required by some embodiments, this embodiment using a binary tree rebalances the tree according to a red-black balancing algorithm. Therefore, the tree may "rotate" such that node 1220 becomes the root node and node 1120 becomes a child of node 1220.

Figure 13:
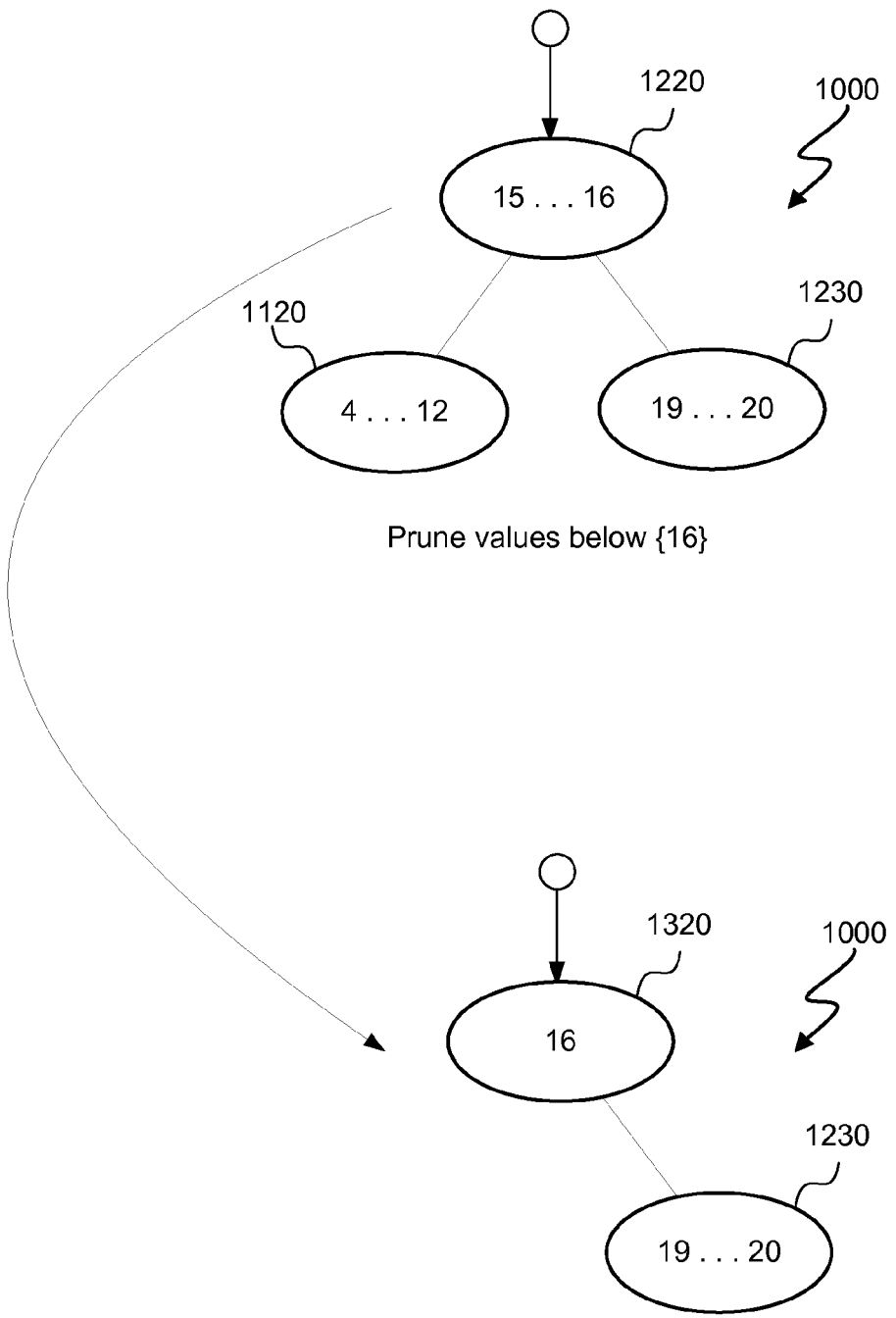
FIG. 13 illustrates the removal of a range of values from a self-optimizing data structure that overlaps multiple existing nodes, according to one embodiment.

FIG. 13 illustrates the removal of a range of values from the data structure 1000 wherein the range overlaps multiple existing nodes, according to one embodiment. This embodiment also illustrates a special function that may be implemented to remove values from the data structure 1000 called "pruning" Often in a constraint solver, a new upper bound be determined for the domain of the represented variable. In other words, the algorithm may determine that all values greater than (or less than) a certain value may be eliminated from the possible solution set. To efficiently remove these values from the data structure 1000, it may be given a command to prune all of the values that are greater than (or less than) a certain value. FIG. 13 illustrates a command to prune all values less than the value of {16}. Two nodes exist with values that must be pruned: node 1120 representing the range {4 . . . 12} could be removed entirely, and node 1220 representing the range {15 . . . 16} could be reduced. Coincidentally, this is also an example of removing a range of values that overlaps with the ranges of multiple existing nodes. Much like the multiple-overlap case when adding values to the tree, removing overlapping ranges may actually reduce the size and/or complexity of the data structure 1000.

Here, the node 1120 may be removed completely, and one of the bounds of node 1220 may be updated to equal the value below which the pruning takes place. The pruning action may be accomplished in one embodiment by having the data structure 1000 locate the node that equals or contains the pruning value, possibly adjusting the bounds of that node, and then removing all nodes including lesser values. In the embodiment of FIG. 13 which uses a binary tree, the pruning operation may include altering the node containing the pruning value, and then removing the left child node and all of its descendants. In another embodiment, the data structure may use the bounds of the range of finite sequential values to turn the prune command into a regular removal of a range. For example, if the lower bound of the range of finite sequential values in FIG. 13 is {4}, then the prune command could be reformulated to remove the range of {4 . . . 15}.

Figure 14:
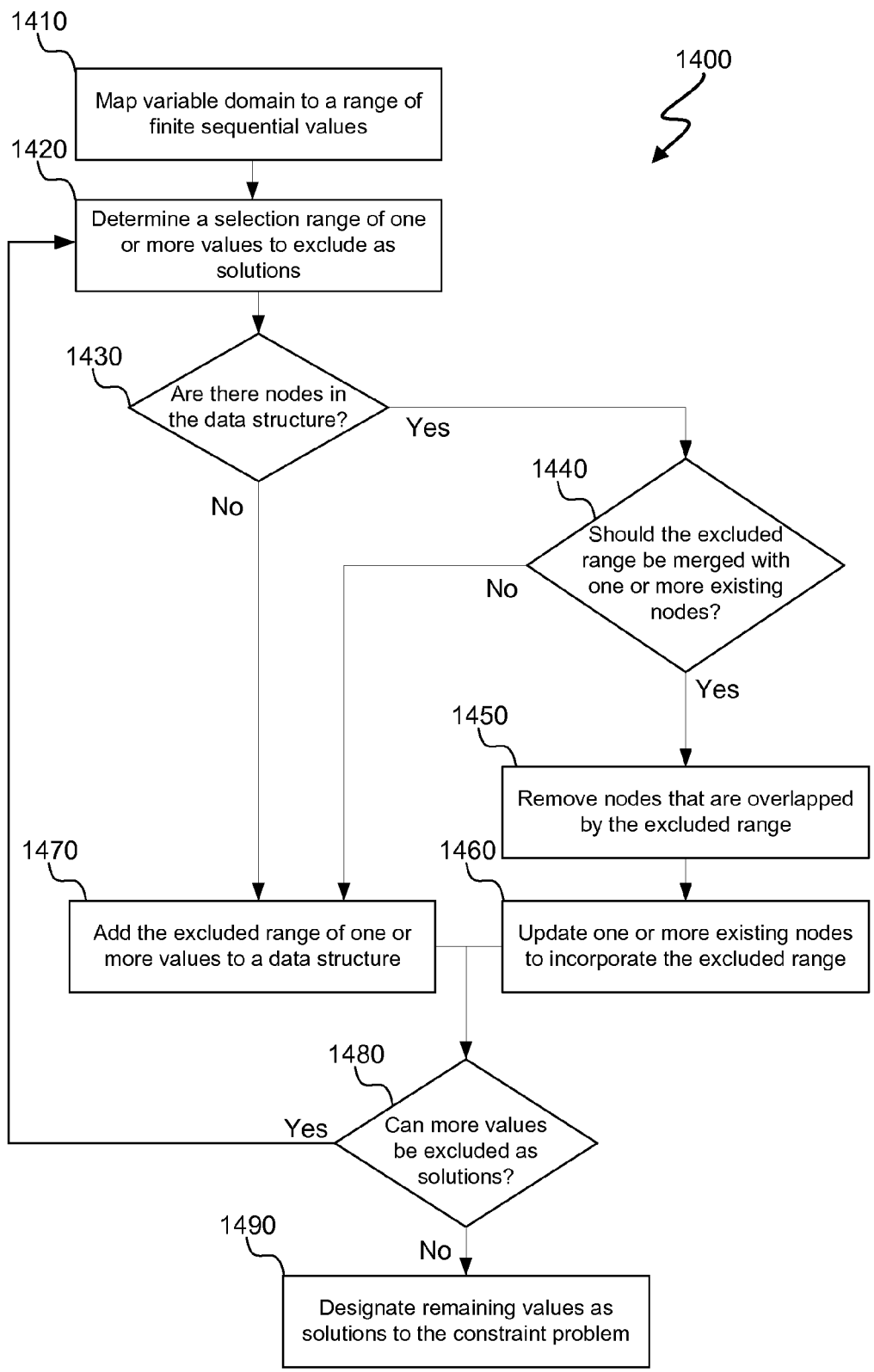
FIG. 14 illustrates a flowchart of a method for solving a constraint problem using a self-optimizing data structure, according to one embodiment.

FIG. 14 illustrates a flowchart 1400 of a method for solving a constraint problem using a self-optimizing data structure, according to one embodiment. At process block 1410, the domain of each variable in the constraint problem may be mapped to a range a finite sequential values. At process block 1420, the constraint solver algorithm may begin analyzing the constraint problem to enforce the constraint rules on the various variable domains. As the algorithm determines that certain variable values violate one or more of the constraints, these values may be eliminated as possible solutions. A range of multiple values or a single value may be designated for removal from the solution space of the variable. At decision block 1430, a self-optimizing data structure may be stored in a memory. If no nodes currently exist in the data structure, i.e., the data structure is empty and this is the first set of values to be excluded as solutions, then the a new node may be created and the excluded range of values may be added to the data structure.

On the other hand, if it is determined that other nodes already exist in the data structure at decision block 1430, then a determination must be made as to whether the excluded range should be merged with one or more of the existing nodes in the data structure at decision block 1440. If it is determined that the excluded range should not be merged with any existing nodes, i.e., the excluded range does not overlap with and is not adjacent to any existing nodes, then the excluded range may be added to the data structure as a new node at process block 1470. However, if the excluded range does overlap with or is adjacent to one or more existing nodes, then it may be merged with those nodes. At process block 1450 nodes may be removed from the data structure that are completely overlapped by the excluded range. At process block 1460, any nodes that partially overlap with or are adjacent to the excluded range should have their bounds adjusted to incorporate the excluded range. The operations of process blocks 1450 and 1460 may be used in various combinations in order to properly add the excluded range. For example, an excluded range that completely overlaps two existing nodes, partially overlaps a third existing node, and is adjacent to a fourth existing node may lead to the removal of three of these existing nodes and updating the remaining existing node.

At process block 1480, it may be determined whether more values may be removed from the range of finite sequential values to be excluded as solutions. If more values may be removed, then the a new excluded range may be determined by returning to process block 1420. If no more values can be removed, then the values not in the data structure may be designated as solutions to the constraint problem by process block 1490. Additionally, if no values may remain, then process block 1490 may determine that no solution exists for the constraint problem. At this point, the constraints or variable domains may be reformulated and the method illustrated by the flowchart 1400 may be executed again.

Figure 15:
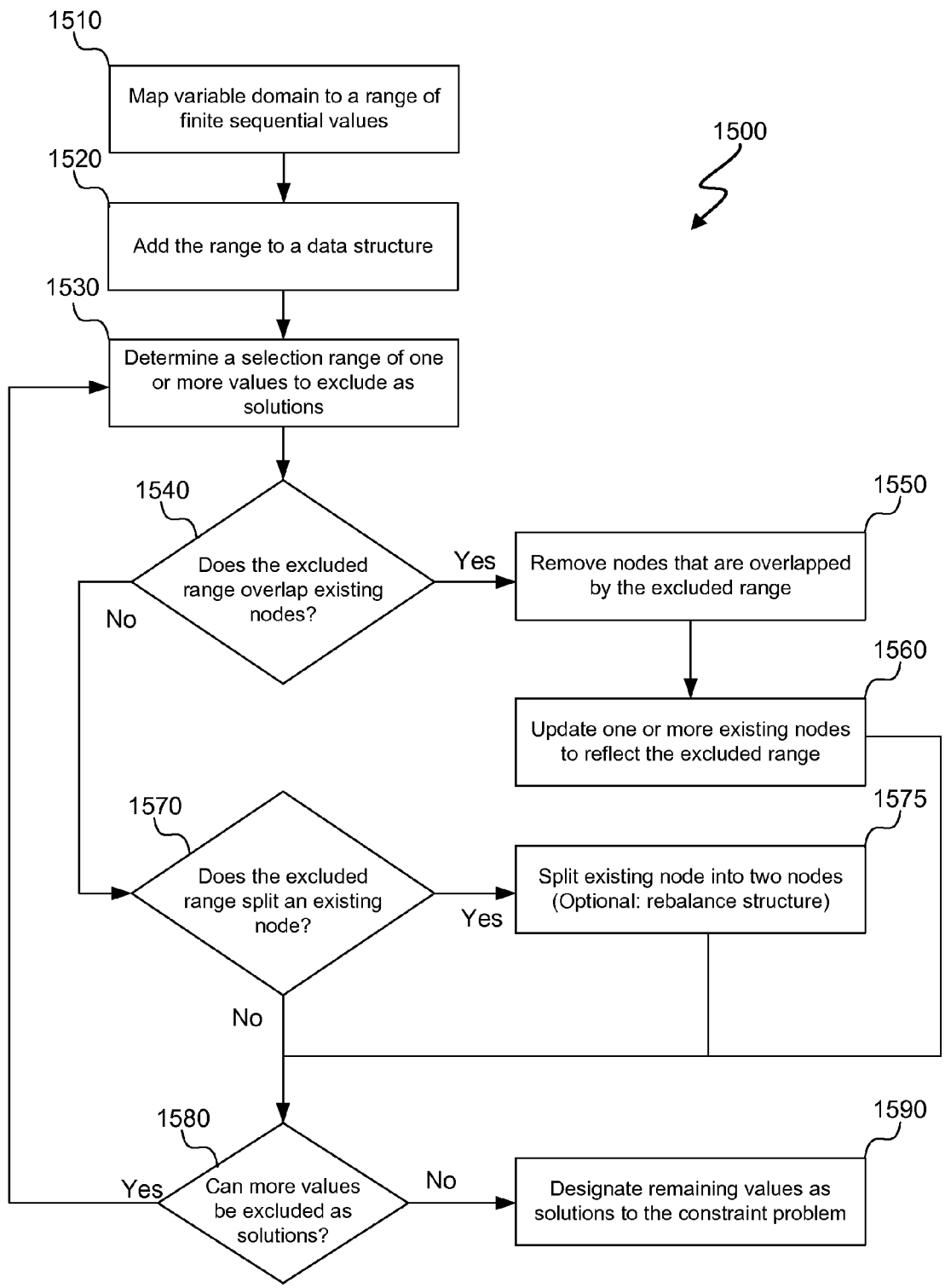
FIG. 15 illustrates flowchart of another method for solving a constraint problem using a self-optimizing data structure, according to one embodiment.

FIG. 15 illustrates a flowchart 1500 of a method for solving a constraint problem using a self-optimizing data structure, according to one embodiment. At process block 1510, the domain of each variable in the constraint problem may be mapped to a range a finite sequential values. At process block 1520, a self-optimizing data structure may be stored in a memory. The initial range of values representing the domain of a variable may also be added to the data structure. In one embodiment, this may be a single node representing the range. In another embodiment, this may be a number of separate ranges, each containing a range of sequential values. At process block 1530, the constraint solver algorithm may begin analyzing the constraint problem to enforce the constraint rules on the various variable domains. As the algorithm determines that certain variable values violate one or more of the constraints, these values may be eliminated as possible solutions. Consequently, a range of multiple values or a single value may be designated for removal from the solution space of the variable. At decision block 1540, the range of excluded values may be removed from the data structure by first determining if the existing range overlaps with one or more existing nodes. In one embodiment, each excluded range would overlap with at least one node in the data structure. However, in another embodiment, the algorithm may generate excluded ranges that overlap with each other, and could therefore lead to some ranges that would not overlap with any node in the data structure.

On the other hand, if it is determined that the excluded range completely overlaps one or more existing nodes at decision block 1540, then the overlapped existing nodes may be removed from the data structure at process bock 1550. If one or more of the existing nodes is only partially overlapped by the excluded range, then the bounds of the existing nodes may be updated to reflect the overlapping portion of the removed range at process block 1560. If instead of overlapping existing nodes, the excluded range is overlapped by an existing node, i.e., if the excluded range falls within an existing node, as determined by decision block 1570, then the existing node maybe split into two nodes at process block 1575. Note that at this stage the data structure may be rebalanced. Rebalancing may also take place after any operation that adds or removes nodes from the data structure.

At process block 1580, it may be determined whether more values may be removed from the range of finite sequential values to be excluded as solutions. If more values may be removed, then a new excluded range may be determined by returning to process block 1530. If no more values can be removed, then the remaining values may be designated as solutions to the constraint problem by process block 1590. Additionally, if no values may remain, then process block 1490 may determine that no solution exists for the constraint problem. At this point, the constraints or variable domains may be reformulated and the method illustrated by the flowchart 1500 may be executed again.

Although many of the examples used herein to provide an enabling disclosure have illustrated single dimensional ranges, other embodiments may also multi-dimensional representations of variable domains. In one embodiment, at least one variable may be represented by a two-, three- or four-dimensional coordinate system. In another embodiment, multiple single-dimensional variables may be combined into a multi-dimensional representation and used as a single variable in the algorithm. Multi-dimensional variables may be represented by multiple single-dimensional data structures, or multi-dimensional data structures may be used.

Figure 16:
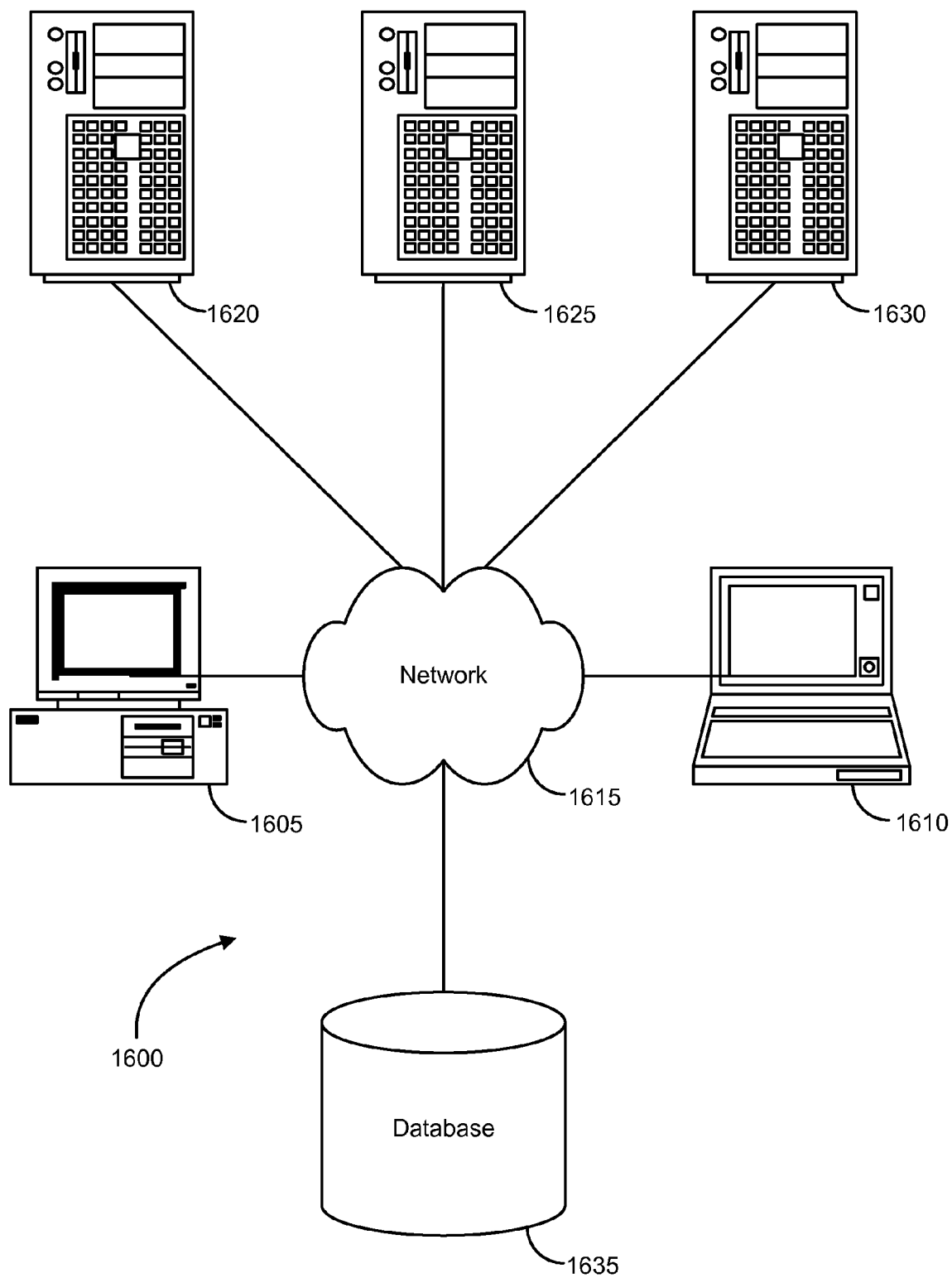
FIG. 16 shows a block diagram illustrating components of an exemplary operating environment in which various embodiments of the present invention may be implemented.

FIG. 16 is a block diagram illustrating components of an exemplary operating environment in which various embodiments of the present invention may be implemented. The system 1600 can include one or more user computers 1605, 1610, which may be used to operate a client, whether a dedicated application, web browser, etc. The user computers 1605, 1610 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 1605, 1610 may also have any of a variety of applications, including one or more development systems, database client and/or server applications, and web browser applications. Alternatively, the user computers 1605, 1610 may be any other electronic device, such as a thin-client computer, Internet-enabled mobile telephone, and/or personal digital assistant, capable of communicating via a network (e.g., the network 1615 described below) and/or displaying and navigating web pages or other types of electronic documents. Although the exemplary system 1600 is shown with two user computers, any number of user computers may be supported.

In some embodiments, the system 1600 may also include a network 1615. The network may can be any type of network familiar to those skilled in the art that can support data communications using any of a variety of commercially-available protocols, including without limitation TCP/IP, SNA, IPX, AppleTalk, and the like. Merely by way of example, the network 1615 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO, etc.

The system may also include one or more server computers 1620, 1625, 1630 which can be general purpose computers and/or specialized server computers (including, merely by way of example, PC servers, UNIX servers, mid-range servers, mainframe computers rack-mounted servers, etc.). One or more of the servers (e.g., 1630) may be dedicated to running applications, such as a business application, a web server, application server, etc. Such servers may be used to process requests from user computers 1605, 1610. The applications can also include any number of applications for controlling access to resources of the servers 1620, 1625, 1630.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1605, 1610. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1605, 1610.

In some embodiments, an application server may create web pages dynamically for displaying on an end-user (client) system. The web pages created by the web application server may be forwarded to a user computer 1605 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 1600 may also include one or more databases 1635. The database(s) 1635 may reside in a variety of locations. By way of example, a database 1635 may reside on a storage medium local to (and/or resident in) one or more of the computers 1605, 1610, 1615, 1625, 1630. Alternatively, it may be remote from any or all of the computers 1605, 1610, 1615, 1625, 1630, and/or in communication (e.g., via the network 1620) with one or more of these. In a particular set of embodiments, the database 1635 may reside in a storage-area network ("SAN") familiar to those skilled in the art. Similarly, any necessary files for performing the functions attributed to the computers 1605, 1610, 1615, 1625, 1630 may be stored locally on the respective computer and/or remotely, as appropriate. In one set of embodiments, the database 1635 may be a relational database, such as Oracle 10g, that is adapted to store, update, and retrieve data in response to SQL-formatted commands.

Figure 17:
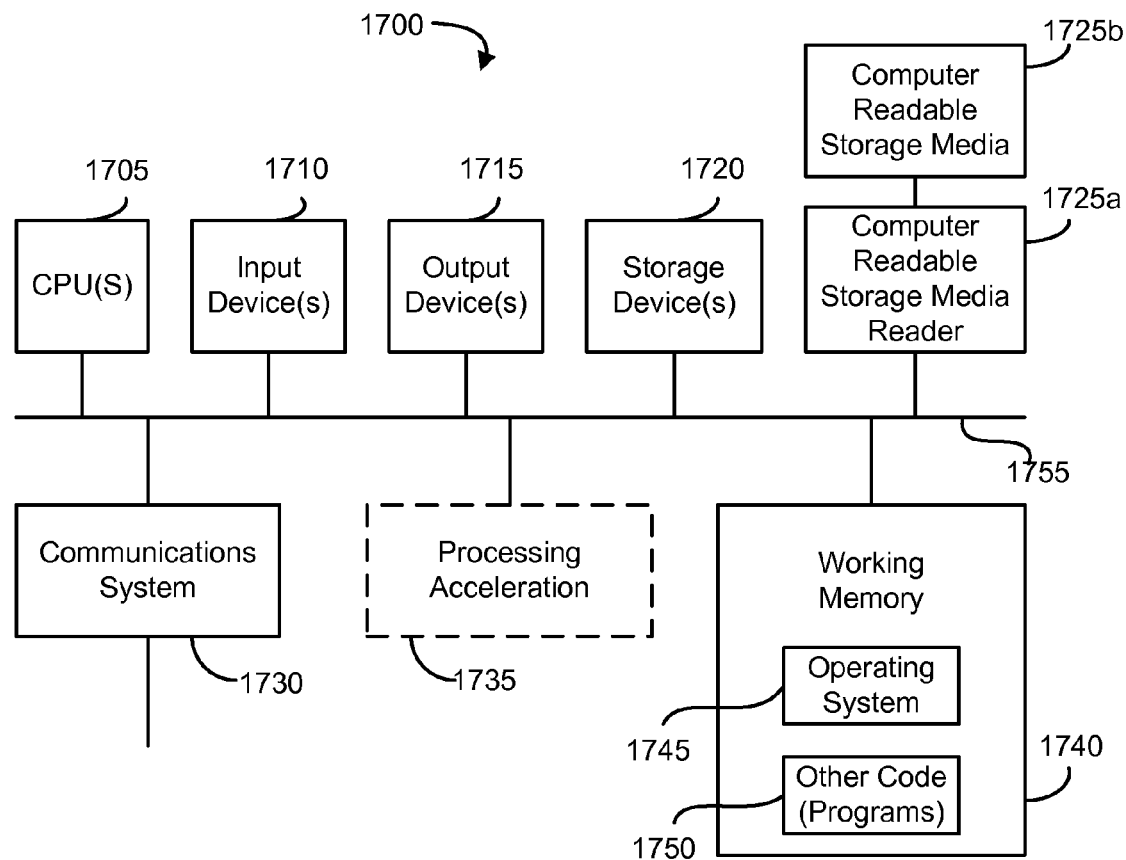
FIG. 17 shows a block diagram illustrating an exemplary computer system in which embodiments of the present invention may be implemented.

FIG. 17 illustrates an exemplary computer system 1700, in which various embodiments of the present invention may be implemented. The system 1700 may be used to implement any of the computer systems described above. The computer system 1700 is shown comprising hardware elements that may be electrically coupled via a bus 1755. The hardware elements may include one or more central processing units (CPUs) 1705, one or more input devices 1710 (e.g., a mouse, a keyboard, etc.), and one or more output devices 1715 (e.g., a display device, a printer, etc.). The computer system 1700 may also include one or more storage device 1720. By way of example, storage device(s) 1720 may be disk drives, optical storage devices, solid-state storage device such as a random access memory ("RAM") and/or a read-only memory ("ROM"), which can be programmable, flash-updateable and/or the like.

The computer system 1700 may additionally include a computer-readable storage media reader 1725a, a communications system 1730 (e.g., a modem, a network card (wireless or wired), an infra-red communication device, etc.), and working memory 1740, which may include RAM and ROM devices as described above. In some embodiments, the computer system 1700 may also include a processing acceleration unit 1735, which can include a DSP, a special-purpose processor and/or the like.

The computer-readable storage media reader 1725a can further be connected to a computer-readable storage medium 1725b, together (and, optionally, in combination with storage device(s) 1720) comprehensively representing remote, local, fixed, and/or removable storage devices plus storage media for temporarily and/or more permanently containing computer-readable information. The communications system 1730 may permit data to be exchanged with the network 1720 and/or any other computer described above with respect to the system 1700.

The computer system 1700 may also comprise software elements, shown as being currently located within a working memory 1740, including an operating system 1745 and/or other code 1750, such as an application program (which may be a client application, web browser, mid-tier application, RDBMS, etc.). It should be appreciated that alternate embodiments of a computer system 1700 may have numerous variations from that described above. For example, customized hardware might also be used and/or particular elements might be implemented in hardware, software (including portable software, such as applets), or both. Further, connection to other computing devices such as network input/output devices may be employed. Software of computer system 1700 may include code 1750 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of efficiently representing ranged data sets in a memory system, the method comprising:
    storing, in the memory system, a data structure comprising one or more nodes, wherein:
        the data structure comprises a binary tree data structure;
        each of the one or more nodes represents a unique range of numeric values by storing an upper bound and a lower bound of the range of numeric values;
        none of the ranges of numeric values represented by the one or more nodes overlap; and
        none of the ranges of numeric values represented by the one or more nodes are adjacent;
    receiving, at a computer system coupled to the memory system, a first range of numeric values to add to the data structure or to remove from the data structure;
    altering, by the computer system, the upper bound or lower bound of at least one node in the one or more nodes to represent the addition or removal of the first range of numeric values such that:
        none of the ranges of numeric values represented by the one or more nodes overlap; and
        none of the ranges of numeric values represented by the one or more nodes are adjacent; and
    receiving, at the computer system coupled to the memory system, a second range of numeric values to add to the data structure.

2. The method of claim 1, wherein:
    for each node having one or more child nodes, a left child node represents a range of numeric values that is less than a range of numeric values represented by the node, and a right child node represents a range of numeric values that is more than a range of numeric values represented by the node.

3. The method of claim 1, further comprising:
adding, by the computer system, a new node to the one or more nodes, wherein the new node represents the second range of numeric values, and wherein:
none of the ranges of numeric values represented by the one or more nodes overlap; and
none of the ranges of numeric values represented by the one or more nodes are adjacent.

4. The method of claim 1, wherein:
the first range of numeric values is to be added to the data structure;
the first range of numeric values partially overlaps with a range of numeric values represented by a first node in the one or more nodes; and
altering, by the computer system, the upper bound or lower bound of at least one node comprises altering either the upper bound or the lower bound of the first node to represent the union of the first range of numeric values and the range of numeric values represented by the first node.

5. The method of claim 1, wherein:
the first range of numeric values is to be added to the data structure;
a range of numeric values represented by a first node in the one or more nodes falls completely within the first range of numeric values; and
altering, by the computer system, the upper bound or lower bound of at least one node comprises altering both the upper bound and the lower bound of the first node to represent the first range of numeric values.

6. The method of claim 2, wherein:
the first range of numeric values is to be added to the data structure;
a range of numeric values represented by a first node in the one or more nodes is adjacent to the ranges of numeric values represented by at least one of the one or more nodes; and
altering, by the computer system, the upper bound or lower bound of at least one node comprises altering the upper bound or the lower bound of the at least one of the one or more nodes to represent a union of the first range of numeric values and the ranges of numeric values represented by the at least one of the one or more nodes.

7. The method of claim 1, further comprising:
receiving, at the computer system, a second range of numeric values to add to the data structure, wherein the second range of numeric values does not overlap and is not adjacent with any of the ranges of numeric values represented by the one or more nodes;
adding, by the computer system, a new node to the one or more nodes that represents the second range of numeric values by storing an upper bound on the lower bound of the second range of numeric values.

8. The method of claim 1, further comprising:
receiving, at the computer system, a second range of numeric values to add to the data structure, wherein the ranges of numeric values represented by at least one of the one or more nodes fall completely within the second range of numeric values; and
consolidating the at least one of the one or more nodes into a single node that represents the second range of numeric values by storing an upper bound and a lower bound of the second range of numeric values.

9. A non-transitory computer-readable medium comprising instructions that, when executed by one or more processors, cause the one or more processors to perform operations comprising:
storing, in a memory system, a data structure comprising one or more nodes, wherein:
the data structure comprises a binary tree data structure;
each of the one or more nodes represents a unique range of numeric values by storing an upper bound and a lower bound of the range of numeric values;
none of the ranges of numeric values represented by the one or more nodes overlap; and
none of the ranges of numeric values represented by the one or more nodes are adjacent;
receiving, at a computer system coupled to the memory system, a first range of numeric values to add to the data structure or to remove from the data structure;
altering, by the computer system, the upper bound or lower bound of at least one node in the one or more nodes to represent the addition or removal of the first range of numeric values such that:
none of the ranges of numeric values represented by the one or more nodes overlap; and
none of the ranges of numeric values represented by the one or more nodes are adjacent; and
receiving, at the computer system coupled to the memory system, a second range of numeric values to add to the data structure.

10. The non-transitory computer-readable medium of claim 9, wherein:
for each node having one or more child nodes, a left child node represents a range of numeric values that is less than a range of numeric values represented by the node, and a right child node represents a range of numeric values that is more than a range of numeric values represented by the node.

11. The non-transitory computer-readable medium of claim 9, comprising additional instructions that, when executed by the one or more processors, cause the one or more processors to perform additional operations comprising:
adding, by the computer system, a new node to the one or more nodes, wherein the new node represents the second range of numeric values, and wherein:
none of the ranges of numeric values represented by the one or more nodes overlap; and
none of the ranges of numeric values represented by the one or more nodes are adjacent.

12. The non-transitory computer-readable medium of claim 9, wherein:
the first range of numeric values is to be added to the data structure;
the first range of numeric values partially overlaps with a range of numeric values represented by a first node in the one or more nodes; and
altering, by the computer system, the upper bound or lower bound of at least one node comprises altering either the upper bound or the lower bound of the first node to represent the union of the first range of numeric values and the range of numeric values represented by the first node.

13. The non-transitory computer-readable medium of claim 9, wherein:
the first range of numeric values is to be added to the data structure;

a range of numeric values represented by a first node in the one or more nodes falls completely within the first range of numeric values; and altering, by the computer system, the upper bound or lower bound of at least one node comprises altering both the upper bound and the lower bound of the first node to represent the first range of numeric values.

14. The non-transitory computer-readable medium of claim 9, wherein:

the first range of numeric values is to be added to the data structure;

a range of numeric values represented by a first node in the one or more nodes is adjacent to the ranges of numeric values represented by at least one of the one or more nodes; and altering, by the computer system, the upper bound or lower bound of at least one node comprises altering the upper bound or the lower bound of the at least one of the one or more nodes to represent a union of the first range of numeric values and the ranges of numeric values represented by the at least one of the one or more nodes.

15. The non-transitory computer-readable medium of claim 9, comprising additional instructions that, when executed by the one or more processors, cause the one or more processors to perform additional operations comprising:

receiving, by the computer system, a second range of numeric values to add to the data structure, wherein the second range of numeric values does not overlap and is not adjacent with any of the ranges of numeric values represented by the one or more nodes;

adding, by the computer system, a new node to the one or more nodes that represents the second range of numeric values by storing an upper bound on the lower bound of the second range of numeric values.

16. The non-transitory computer-readable medium of claim 9, comprising additional instructions that, when executed by the one or more processors, cause the one or more processors to perform additional operations comprising:

receiving, by the computer system, a second range of numeric values to add to the data structure, wherein the ranges of numeric values represented by at least one of the one or more nodes fall completely within the second range of numeric values; and consolidating, by the computer system, the at least one of the one or more nodes into a single node that represents the second range of numeric values by storing an upper bound and a lower bound of the second range of numeric values.

* * * * *

UNITED STATES PATENT AND TRADEMARK OFFICE
CERTIFICATE OF CORRECTION

PATENT NO.         : 9,442,965 B2                                    Page 1 of 1
APPLICATION NO.    : 13/972490
DATED              : September 13, 2016
INVENTOR(S)        : Colena It is certified that error appears in the above-identified patent and that said Letters Patent is hereby corrected as shown below:

In the Specification

In Column 11, Line 36, delete ""pruning"" and insert -- "pruning". --, therefor.

In Column 12, Line 20, delete "the a" and insert -- the --, therefor.

In Column 12, Line 49, delete "the a" and insert -- the --, therefor.

Signed and Sealed this
Twenty-fifth Day of April, 2017

Michelle K. Lee
*Director of the United States Patent and Trademark Office*